US010740824B2

(12) United States Patent
Becker et al.

(10) Patent No.: US 10,740,824 B2
(45) Date of Patent: Aug. 11, 2020

(54) PRODUCT DELIVERY SYSTEM AND METHOD

(71) Applicant: Amadeus S.A.S., Biot (FR)

(72) Inventors: Muriel Becker, Grasse (FR); Vincent Laperrousaz, St. Paul (FR); David Pauchet, Pegomas (FR)

(73) Assignee: Amadeus S.A.S., Biot (FR)

(*) Notice: Subject to any disclaimer, the term of this patent is extended or adjusted under 35 U.S.C. 154(b) by 295 days.

(21) Appl. No.: 15/922,356

(22) Filed: Mar. 15, 2018

(65) Prior Publication Data

US 2019/0287151 A1 Sep. 19, 2019

(51) Int. Cl.
*G06Q 30/02* (2012.01)
*G06Q 30/06* (2012.01)
*G06F 16/22* (2019.01)

(52) U.S. Cl.
CPC ..... *G06Q 30/0631* (2013.01); *G06F 16/2246* (2019.01); *G06Q 30/0254* (2013.01); *G06Q 30/0256* (2013.01); *G06Q 30/0283* (2013.01); *G06Q 30/0601* (2013.01)

(58) Field of Classification Search
None
See application file for complete search history.

(56) References Cited

U.S. PATENT DOCUMENTS

| 7,899,710 | B1* | 3/2011 | Walker | G06Q 30/0224 |
| | | | | 705/14.54 |
| 8,712,860 | B2* | 4/2014 | Walker | G06Q 30/0224 |
| | | | | 705/26.1 |
| 9,098,881 | B2 | 8/2015 | Ciabrini et al. | |
| 9,235,620 | B2 | 1/2016 | Ciabrini et al. | |
| 10,062,125 | B2* | 8/2018 | Widjaja | G06Q 30/06 |
| 10,078,858 | B2* | 9/2018 | Barraud | G06F 16/3322 |
| 10,115,146 | B1* | 10/2018 | Anderson | G06Q 30/02 |
| 10,152,740 | B2* | 12/2018 | Becker | G06Q 30/0631 |
| 10,324,598 | B2* | 6/2019 | Kelly | G06F 16/9535 |
| 2008/0046343 | A1* | 2/2008 | Maguire | G06Q 30/06 |
| | | | | 705/26.62 |
| 2008/0270254 | A1 | 10/2008 | Patoureaux et al. | |

(Continued)

FOREIGN PATENT DOCUMENTS

| CN | 107609894 A | * | 1/2018 |
| CN | 107633414 A | * | 1/2018 |

OTHER PUBLICATIONS

Zhang, H., et al., "MCRS: A Course Recommendation System for MOOCs," Multimedia Tool and Applications, 77: 7051-7069, published online Apr. 3, 2017. (Year: 2017).*

(Continued)

*Primary Examiner* — Nicholas D Rosen
(74) *Attorney, Agent, or Firm* — Thompson Hine LLP

(57) ABSTRACT

Systems, methods and computer program products for determining a list of products in response to a client request received from a client device during a request/response session. Occurrence frequency and auxiliary product value information for each auxiliary product set in a list of auxiliary product sets are determined from a tree data structure in response to a client request. A list of candidate auxiliary products for each main product is determined using the occurrence frequency and a service value determined for each auxiliary product set in the list of auxiliary product sets.

25 Claims, 10 Drawing Sheets

(56) References Cited

U.S. PATENT DOCUMENTS

| | | | | |
|---|---|---|---|---|
| 2011/0131089 | A1* | 6/2011 | Walker | G06Q 30/0224 |
| | | | | 705/14.25 |
| 2012/0163196 | A1* | 6/2012 | Jansen | H04L 29/12933 |
| | | | | 370/248 |
| 2012/0330693 | A1* | 12/2012 | Ciabrini | G06Q 10/02 |
| | | | | 705/5 |
| 2013/0003868 | A1* | 1/2013 | Sjoberg | A63B 53/047 |
| | | | | 375/240.26 |
| 2013/0073586 | A1 | 3/2013 | Aubry et al. | |
| 2013/0290324 | A1 | 10/2013 | Gibergues et al. | |
| 2014/0052750 | A1* | 2/2014 | Ciabrini | G06F 16/24552 |
| | | | | 707/769 |
| 2014/0074649 | A1* | 3/2014 | Patel et al. | G06Q 30/0631 |
| | | | | 705/26.7 |
| 2014/0358598 | A1* | 12/2014 | Widjaja | G06Q 10/02 |
| | | | | 705/5 |
| 2016/0048556 | A1* | 2/2016 | Kelly | G06F 16/9535 |
| | | | | 707/767 |

OTHER PUBLICATIONS

Shapoval, V., et al., "Data Mining in Tourism Data Analysis: Inbound Visitors to Japan," Journal of Travel Research, vol. 57(3), pp. 310-317, 2018 (Year: 2018).*

Hans-Peter Kriegel, "Performance comparison of index structures for multi-key retrieval", Proceedings of the 1984 ACM SIGMOD international conference on Management of data, pp. 186-196, Boston, Massachusetts—Jun. 18-21, 1984.

Yagoub et al., "Caching Strategies for Data-Intensive Web Sites", Proceedings of the 26th International Conference on Very Large Data Bases, pp. 188-199, Sep. 10-14, 2000.

National Institute of Industrial Property, Preliminary Search Report issued in French Patent Application No. 1852213 dated Nov. 12, 2018.

* cited by examiner

PRODUCT DELIVERY SYSTEM AND METHOD

TECHNICAL FIELD

The invention generally relates to client/server architectures and, in particular, to systems, methods and computer systems for delivering products to a client device in response to a client request.

BACKGROUND

Over the past decades, the Internet has dramatically revolutionized the architecture of computerized systems. In particular, the Internet has transformed conventional content provider systems into dynamic and highly interactive online systems using client/server architectures.

Modern content provider systems use one or more server computing devices (also referred to as server devices or servers) which receive client requests from client computing devices (also referred to as client devices) through a dedicated user interface via a communication network. A user can accordingly directly submit a request (also referred to as a query) using a client device for content through the dedicated user interface to access content such as a product. The server device can search for one or more candidate products that satisfy the user request, using a search engine, and return a response to the client device through the dedicated interface. The response can comprise the list of candidate products (also called product proposals or solutions) determined by the search engine and various information related to each candidate product. The user can then select one product among the candidate products and initiate a purchase transaction to purchase the product.

Some existing content provider systems also provide auxiliary products also called "complementary products" or "services" in connection with the delivered products. Such ancillary services can be directly provided by the content provider system or provided by another indirect content provider system.

For example, the content provider system may be a travel provider system which determines the best journey options in response to a user request for a travel, the user specifying on a user interface a set of parameter requests such as a date, a departure geographical location and an arrival geographical location, and possibly additional user preferences (e.g., cost criteria, connections, etc.). The user can thus access the dedicated user interface of the travel management system and submit a travel request to obtain travel information and/or buy a travel product (travel booking) such as a flight product for a given itinerary at a given date. In some situations, the user can need additional services related to the travel product such as optional services related to the travel (e.g., meal service, seat related services, pet transport service, etc.).

The search engine of conventional content provider systems use important resources to process each user request, such processing requiring a huge number of accesses to data stored in several databases or cache resources and to determine candidate products, thereby resulting in high computational cost.

To optimize the computational cost of the search engine, different approaches were proposed. A first approach is based on a limitation of the search domain in which the search engine determines the candidate solution using an optimized search algorithm or pre-filtering.

Another existing approach consists in using pre-computed data to limit the computations required to process each request.

To optimize the resources of the content provider system (booking or purchasing system for example), still another existing approach has been proposed which is based on the use of a "pre-transaction" content provider system (as also called "pre-booking", "pre-purchasing", or "pre-shopping" system for example) connected to the transaction system to provide product recommendations in a pre-transaction phase (also referred to as a "recommendation" or "pre-processing" phase). The pre-transaction content provider system (also referred to as a pre-transaction system hereinafter) provides product information to a client device derived from statistical data in response to a user request. More specifically, instead of computing the response to each request in real-time from up-to-date databases, the pre-transaction content provider system uses statistical data related to previously purchased products over a past period. Similarly to the transaction content provider system, the pre-transaction content provider system returns candidate products (for example travel proposals) to the client device, the information associated with the products (such as the product price for example) being thus determined from past transactions. Further, the pre-transaction content provider system can process a request even if a limited number of request parameters are inputted by the user. The user has thus access to statistical information about available products without a need for the search engine to process the requests in real time and access to multiple databases. If the user wishes to perform a transaction (e.g., buy or book a product), he can select a product in the interface dedicated to the pre-transaction content provider system to be redirected to the content provider system or can directly access the content provider system.

Currently, such pre-transaction systems can only provide information about the direct products (main products) delivered by the content provider system because they handle a huge volume of product related data. Conventional pre-transaction systems do not generally provide information about complementary products (i.e., services) related to a product (such as for example the service availability in connection with a product and service price). In some cases, they can at most provide very limited and not fully accurate ancillary services information. Because of the relationship between an ancillary service and a product, setting values for a service (service values or prices) requires linking such value to the product value (product price), which involves an exponential processing complexity.

However, in some situations, a user will only complete/validate a transaction (i.e., purchase a product) if specific services are available. Exemplary services in the travel field include for example additional room, availability of vegetarian meal, availability of Video-On-Demand during a flight, animal travel options, etc. Accordingly, after accessing the pre-transaction system, a user may submit several transaction requests to the transaction content provider system, access to the product proposals and check the service options. The user may finally decide not to proceed with the transaction because of unavailability of specific service(s), or submit additional requests to the transaction content provider system with different parameters to try to find products with the desired service(s) at the best price. This results in additional computational cost at the transaction system. Such additional cost is all the more important as linking services with products as such requires important computational resources with several accesses to different databases at the server side. Such load of the transaction system can limit its performances, the processing time of the requests and its quality of service. The user experience can be deeply impacted by such a slow processing rate, thereby deterring the users from completing the transaction or inducing them to turn to another content provider system.

Improved systems and methods for delivering products and services connected to the products that limit the overload of the content provider system are accordingly needed.

SUMMARY

In order to address these and other problems, there is provided a server system configured to determine a list of products in response to a client request received from a client device during a request/response session, the client request comprising one or more request parameters. The product provider system comprises a product estimator configured to determine a list of main products, the list of main products comprising an estimation of the one or more main products matching the client request. The product provider system further cooperates with an auxiliary product estimation database configured to store historical data related to sets of auxiliary products, the historical data being represented by a tree data structure comprising nodes. The server system further comprises an auxiliary product estimator configured to determine from the tree data structure an occurrence frequency and an auxiliary product value information for each auxiliary product set in a list of auxiliary product sets, in response to the client request, the list of auxiliary product sets comprising at least one auxiliary product set, the server system being configured to further provide a list of candidate auxiliary products for each main product determined in response to the client request using the occurrence frequency and the service value determined for each auxiliary product set of the list of auxiliary product sets.

In some embodiments, the client request is received at a given processing time, each auxiliary product set identifies one or more auxiliary products related to a main product. The historical data may then comprise data collected from previous request/response sessions, each previous request/response session being implemented between a client device and a product provider system connected to the auxiliary product estimation database during a predefined time period before the processing time.

The tree data structure may comprise a root node and a plurality of levels, each level of the tree data structure corresponding to a parameter derived from one or more request parameter. Each node of a given level of the tree data structure may then comprise a node value representing a value of the parameter corresponding to the level, the value being assigned to the request parameter in the one or more previous request/response sessions over the time period. The last level of each branch of the tree may comprise leaf nodes, with each leaf node corresponding to a given auxiliary product set.

In some embodiments, each leaf node of the tree data structure corresponding to a given auxiliary product set may further comprise a counter value and a value information, the counter value indicating the number of occurrences of the auxiliary product set in the previous request/response sessions, the auxiliary product estimator being configured to determine the occurrence frequency of each auxiliary product set of the list of auxiliary product sets using the counter value of the leaf node corresponding to the auxiliary product set in the tree data structure, the auxiliary product estimator being further configured to determine the auxiliary product value information for each auxiliary product set of the list of auxiliary product sets from the value information of the leaf node corresponding to the auxiliary product set in the tree data structure.

In one embodiment, the value information comprised in each leaf node corresponding to a given auxiliary product set may comprise a value range defined by a lower threshold and an upper threshold, the lower threshold representing to the lower value assigned to the auxiliary product set in a previous request/response session during the predefined time period and the upper threshold representing to the higher value assigned to the auxiliary product set in a previous request/response session during the predefined time period.

If the client request comprises a request parameter specifying a given auxiliary product set, the list of auxiliary product sets may comprise the auxiliary product set, the auxiliary product estimator being configured to browse the tree data structure according to a tree search algorithm to determine a matching node having a path in the tree matching the request parameters of the client request, the auxiliary product estimator being further configured to search for a leaf node in a subtree of the matching node that matches the given auxiliary product set and a threshold condition related to the leaf node occurrence frequency, the occurrence frequency and the auxiliary product value information of the unique auxiliary product set being retrieved from the leaf node.

If the client request does not comprise a request parameter specifying a given auxiliary product set, the auxiliary product estimator may be configured to browse the tree data structure according to a tree search algorithm to determine a matching node having a path in the tree matching the request parameters of the client request, the auxiliary product estimator being further configured to search for all leaf node in a subtree of the matching node, the auxiliary product estimator being configured to determine a popularity indicator for the auxiliary product set associated with each found leaf node and select one or more auxiliary product sets among the auxiliary product sets associated with the found leaf nodes depending on the popularity indicators, the selected auxiliary product sets being added in the list of auxiliary product sets, the occurrence frequency and the value information of each auxiliary product set in the list of auxiliary product sets being retrieved from the corresponding leaf node.

In some embodiments, the system comprises an auxiliary product popularity calculator configured to determine the popularity indicator of each auxiliary product set of a leaf node using the occurrence frequency associated with the leaf node.

The system may further comprise a pre-processing coordinator configured to update the value information estimated by the auxiliary product estimator for each auxiliary product set of the list of auxiliary product sets from real-time data.

In one embodiment, the system may comprise an auxiliary product correlator configured to integrate the information value of each auxiliary product set of the list auxiliary product sets to the value of a main product determined by the product estimator, depending on an applicability flag.

The system may further comprise an auxiliary product learning engine configured to collect learning meta data during a predefined learning period, the system further comprising a tree manager for managing the tree data structure using the collected learning-metadata.

The tree manager may be configured to create a node in the tree data structure in response to the specification of a new value of a parameter corresponding to a level of the tree, in a real-time request/response session, and set the counter value of the node to the value 1.

The tree manager may be configured to update a node in the tree data structure each time the value associated with the node is specified in a request/response session for the parameter corresponding to the node level, and increment the counter value of the node.

In one embodiment, the tree manager may be configured to periodically check the configuration of the tree data structure and apply a balancing algorithm to the tree data structure if the tree data structure is unbalanced.

There is further provided a method of determining a list of products in response to a client request received from a client device during a request/response session, the client request comprising one or more request parameters, the method comprising a step of determining a list of main products, the list of main products comprising an estimation of the one or more main products matching the client request. The method further comprises determining an occurrence frequency and an auxiliary product value information for each auxiliary product set in a list of auxiliary product sets, from a tree data structure representing historical data related to sets of auxiliary products, in response to the client request, the list of auxiliary product sets comprising at least one auxiliary product set, the tree data structure comprising nodes. The method further comprises providing a list of candidate auxiliary products for each main product determined in response to the client request using the occurrence frequency and the service value determined for each auxiliary product set of the list of auxiliary product sets.

There is also provided a computer program product for determining a list of products in response to a client request received from a client device during a request/response session, the client request comprising one or more request parameters. The computer program product includes a non-transitory computer-readable storage medium and program code stored on the non-transitory computer-readable storage medium that, when executed by one or more processors, causes the one or more processors to determine a list of main products, the list of main products comprising an estimation of the one or more main products matching the client request, and determine an occurrence frequency and an auxiliary product value information for each auxiliary product set in a list of auxiliary product sets, from a tree data structure representing historical data related to sets of auxiliary products, in response to the client request, the list of auxiliary product sets comprising at least one auxiliary product set, the tree data structure comprising nodes. The one or more processors are further caused to provide a list of candidate auxiliary products for each main product determined in response to the client request using the occurrence frequency and the service value determined for each auxiliary product set of the list of auxiliary product sets.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. Like reference signs refer to like elements throughout the following description of embodiments.

DETAILED DESCRIPTION

Embodiments of the invention provide a server system and a method for determining a list of products in response to a client request received from a client device, in a computer environment, during a request/response session, the list of products (also called product recommendations) comprising a list of the candidate main products that satisfy the client request and for at least one main product one or more auxiliary products (also referred to hereinafter as "services" or "ancillary services") related to the main product proposed to the client device. Embodiments of the invention have particular advantages when the request/response session corresponds to a pre-transaction phase, the invention enabling integration of service recommendations in association with each product recommendation determined in response to the client request, during such pre-transaction phase, As used herein, the term "pre-transaction" refers to a phase prior to a transaction flow implemented in a transaction system, a transaction flow starting from a user request received by the transaction system for a product specified by the parameters of the request and terminated by a purchase operation of a product through the transaction system (the term "transaction" is also referred to as "purchase", "shopping" or "booking"). In a client server architecture, a "transaction" corresponds to a request/response session initiated by a client request and terminated by the purchase of a product (selection of a main product by the user and validation of the selection by payment of the price value associated with the product). The product transaction may comprise a main product and an associated auxiliary product set (service set) comprising one or more auxiliary products (services) related to the main product, the overall value (total price) of the transaction comprising the value of the main product added to the value of the service set.

As used herein, a pre-transaction phase is initiated by one or more user requests (which may be "open" requests) and returns a list of estimated candidate products (also called product "recommendations") delivered by the transaction system which are likely to be available using various data which may include statistical data. Such statistical data may be used to provide more information in case a given set of services has not been pre-computed. A pre-transaction phase thus returns statistical information about the products.

Figure 1:
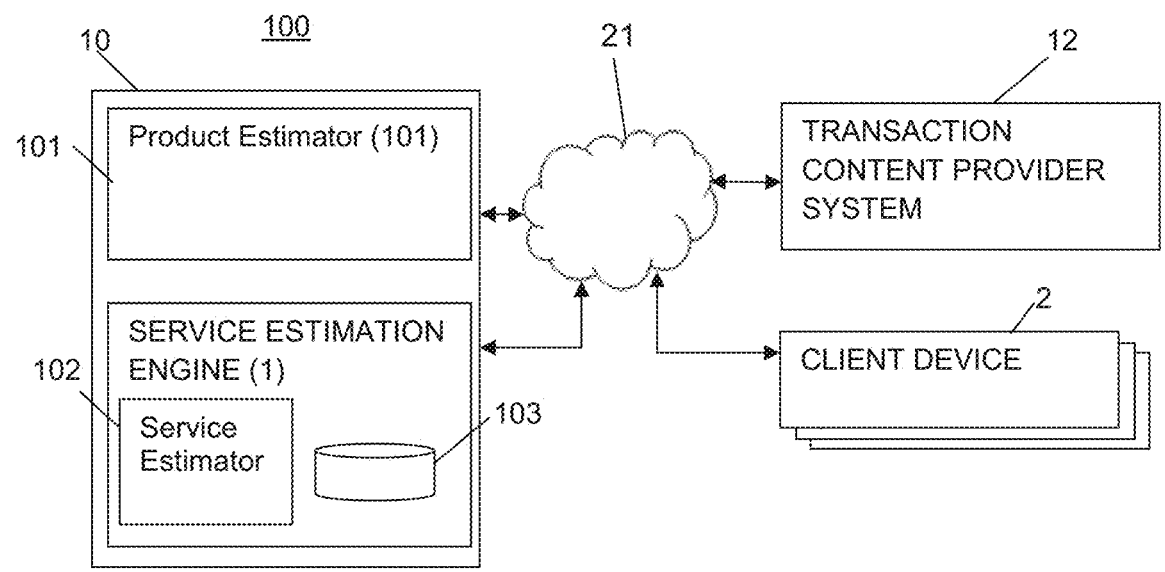
FIG. 1 depicts an example of an operational environment of a pre-transaction content provider system in accordance with embodiments of the invention.

With reference to FIG. 1, an example operational environment 100 of a pre-transaction content provider system 10 is shown, according to some embodiments.

The pre-transaction content provider system 10 (also referred to hereinafter as a pre-transaction system or "server system") may be configured to determine a set of candidate product recommendations to a client or user device 2 in response to a user request (referred to as a pre-transaction request) identifying one or more request parameters among a set of request parameters predefined by a request format, in a pre-transaction phase.

In one embodiment, the pre-transaction content provider system 10 may host one or more websites and/or have a hosting service host one or more websites.

As used herein, the term "content" refers to any content that may be provided to a user device through a user interface in the form of products, each product being possibly associated with one or more services ("ancillary services") related to the products. Each product may be defined by a set of parameters depending on the application field of the invention, and a value (price). A representation of such content may be generated on a Graphical User Interface using various representation elements such as electronic text, images, pictures, audio recordings, and other data forms which can be processed, stored, and returned.

Each client device 2 (also referred to hereinafter as a "user device") may be a personal computing device, a tablet computer, a thin client terminal, a smartphone, and/or other such computing device. Each client device 2 may host web browsers and/or custom applications software (e.g., a client system) and may include a client user interface.

Each user device 2 may further include a web-browser application that communicates with a web-server application hosted by the pre-transaction system 10.

The pre-transaction system 10 may communicate with one or more "transaction" content provider systems 12 (also referred to as a "transaction system" 12) via a dedicated network 21 to enable the pre-transaction system 10 to access historical data maintained by each transaction system 12.

Each transaction system 12 may be configured to process in real-time user requests (also called "transaction" requests) using a search engine configured to access in real-time to one or more content databases. It is further adapted to perform transactions with a user (such as booking or purchasing of a product and possibly of services associated with the product). A transaction for a product is completed when a user proceeds with the payment of the product and of the optional services. In some embodiments, the transaction system 12 may be configured to only process user requests which comprise a set of mandatory request parameters.

A user operating one of the user devices 2 may directly interface with the pre-transaction system 10 using a dedicated pre-transaction user interface during a client/server session. In some embodiments, the pre-transaction system 10 may be configured to redirect a user device 2 to a dedicated interface of the transaction system 12, in response to a selection of a product by a user. The user may further directly interface with the transaction content provider system 12 using the dedicated pre-transaction user interface.

The transaction content provider system 12 may store a user account if the user is already registered, or alternatively may comprise no data related to the user if the user has not previously created a user account.

The pre-transaction system 10 and the transaction system 12 are dedicated to the same application field (for example, the travel field). Both the pre-transaction and the transaction systems 10 and 12 may be configured to determine candidate products of the same type. However, they relate to different transaction phases. Further, while the transaction content provider system 12 may comprise a search engine implementing a search algorithm to search products matching a request in one or more content databases, the pre-transaction system 10 may comprise a product estimator 101 configured to estimate the products solutions (candidate products) to a user request by searching statistics data related to past transactions performed at the transaction system 12, without a need to access to the multiple content databases. Accordingly while the responses returned by the pre-transaction system 10 may be based on historical data, the responses returned by the transaction content provider system 12 may be based on real-time data retrieved from content databases. The pre-transaction system 10 thus limits the load of the transaction content provider system 12, a user desiring to have a view of the possible product options being able to submit an open request to the pre-transaction system 10, refine his or her request depending on the results returned by the pre-transaction system 10, and submit the refined request to the transaction content provider system 12 if the user decide to proceed with a transaction.

In some embodiments, the pre-transaction system 10 (server system) may comprise a service estimation engine 1 (also called "auxiliary product estimation engine") configured to estimate service recommendations in response to a pre-transaction request. The service estimation engine 1 may comprise a service experience database 103 configured to store historical data related to sets of services (also referred to as "auxiliary products" or "complementary products"), the historical data being represented by a tree data structure comprising nodes. The service estimation engine 1 may further comprise a service estimator 102 (also referred to as an "auxiliary product estimator") configured to determine from the tree data structure an occurrence frequency and an auxiliary product value information for each service set in a list of auxiliary product sets, in response to the client request. The list of service sets may comprise at least one service set (a service set may be also referred hereinafter as an "auxiliary product set"), the pre-transaction system 10 being configured to further provide a list of candidate auxiliary products for each main product determined in response to the client request using the occurrence frequency and the service value determined for each auxiliary product set of the list of auxiliary product sets.

The pre-transaction system 10 may be configured to provide service recommendations for each candidate product using the occurrence frequency and the service value determined for each service set of the list of service sets.

In one embodiment, the client request may be received by the pre-transaction system 10 at a given processing time, and each service set may identify one or more auxiliary products related to a main product. In such embodiment, the historical data comprises data collected from previous request/response sessions (previous transactions), each previous transaction being implemented between a client device and a product provider system connected to the service experience database 103 during a predefined time period before the processing time.

In an exemplary application of the invention to the travel field, the pre-booking system 10 may be configured to provide travel recommendations for travel products (candidate travel products), such as airline travel products.

A travel request has a predefined format defining a set of request parameters including, but not limited to, departure location/date/time parameters, arrival location/date/time parameters, and additional travel related parameters.

The request parameters for the transaction travel provider system 12 (also referred to hereinafter as a "booking" or "shopping" system) may include "mandatory" and/or "optional" request parameters, the mandatory request parameters being required by the "booking" system to be able to process the request. The optional request parameters may include for example the user preferred language, or refining parameters (e.g., time of day, preferred company). Generally, the pre-transaction travel provider system 10 (also referred to hereinafter as a "pre-booking" or "pre-shopping" system) can launch a request without any requirement regarding mandatory request parameters. For example, the processing of a request can be initiated for any request comprising at least one request parameter.

A travel request parameter may have a typology (for example "departure location", "arrival location"), a data category (e.g., location, date), a data type (e.g., char) and/or a data format (defined for example by IATA standard, IATA standing for "International Air Transport Association").

Embodiments of the invention may be implemented by one or more computing system comprising one or more networked computers or servers. The computing systems may provide processing and database functions for the pre-transaction and transaction content provider systems 10 and 12.

The pre-transaction system 10 and the transaction content provider system 12 may host one or more websites and/or have a hosting service host one or more websites.

The communication network 21 may include one or more private and/or public networks (e.g., the Internet) that enable the exchange of data such as the Internet, a local area network (LAN), a wide area network (WAN), a cellular voice/data network, one or more high speed bus connections, and/or other such types of communication network. Each communication network 21 may use standard communications technologies and/or protocols such as 4G, Ethernet, 802.11, TCP/IP (Transmission Control Protocol/Internet Protocol, HTTP (Hypertext Transport Protocol), FTP (File Transfer Protocol), etc. Data can be exchanged over each network 21 according to different data exchange technologies and/or formats such as the hypertext markup language (HTML) and the extensible markup language (XML).

The pre-transaction system 10 may comprise a redirection function to redirect the user to the Internet Domain of the transaction system 12 using an associated URL, in response to a selection made by the user of a candidate product to enable him to complete a transaction. In some embodiments, the pre-transaction system device 10 may send a request corresponding to the user selection to the transaction system 12 using a URL of a predefined type which may comprise a set of fields such as a Body, the content provider system identifier field such as a Chain field, and additional fields related to the request parameters (name/value pairs) as selected by the user.

Figure 2:
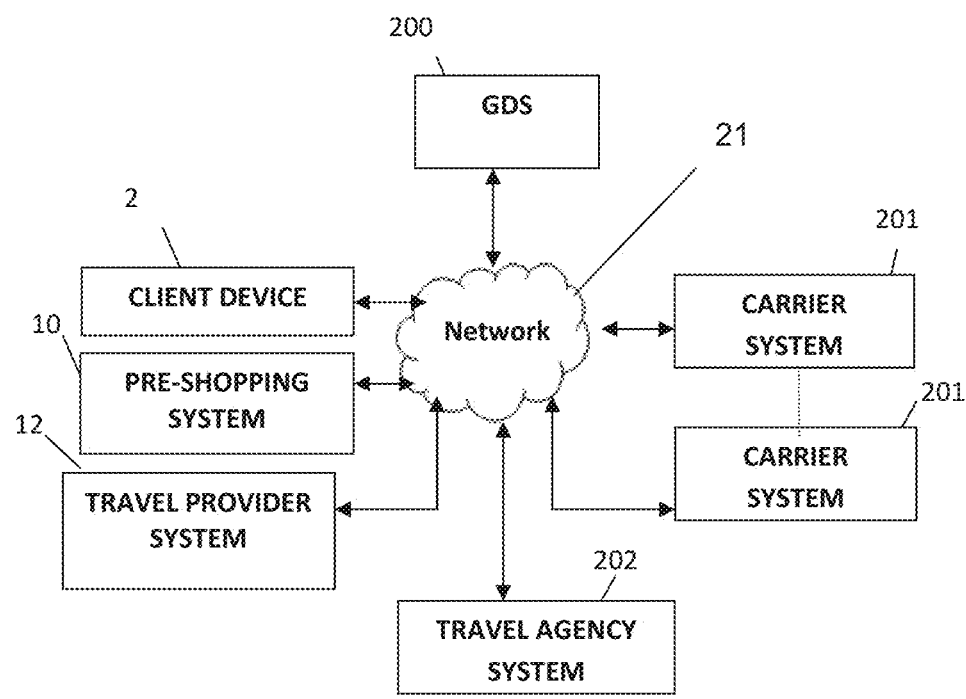
FIG. 2 represents an operational environment of a pre-transaction travel provider system (referred to hereinafter as a "pre-booking system") according to an exemplary application of the invention to the travel field.

FIG. 2 represents the operational environment of a pre-transaction travel provider system 10 (referred to hereinafter as a "pre-booking system") according to an exemplary application of the invention to the travel field. The environment may include a Global Distribution System (GDS) 200, one or more indirect product provider systems such as carrier systems 201, one or more travel shopping or indirect seller systems (auxiliary content provider systems), such as a travel agency system 202, a pre-transaction provider system 10, a transaction provider system 12 and one or more client devices 2. Each of the GDS 200, the carrier systems 201, the indirect seller system 202, the pre-transaction system 10 and the transaction system 12, and the user device 2 may communicate through the network 21. The carrier systems 201 may each include a Computer Reservation System (CRS) and/or billing system for the respective airline that enables the GDS 200 and/or indirect seller system 202 to reserve and pay for airline tickets. The carrier systems 201 may also interact with each other, either directly or through the GDS 200, to enable a validating carrier to sell tickets for seats provided by an operating carrier. The operating carrier may then bill the validating carrier for the services provided.

The GDS 200 may be configured to facilitate communication between the carrier systems 201 and indirect seller systems 202 by enabling travel agents, validating carriers, or other indirect sellers to search for available segments and book reservations on one or more carrier systems 201 via the GDS 200. To this end, the GDS 200 may maintain links to each of the carrier systems 201 via the network 21. These links may allow the GDS 200 to obtain scheduling and availability data for segments from the carrier systems 201, and travel proposal reservation requests to the carrier systems 201. The carrier and travel agency systems 201, 202 may thereby book flights, trains, or other types of segments on multiple carriers via a single connection to the GDS 200. The GDS 200 may store and/or maintain a Passenger Name Record (PNR) that includes a complete set of data for an itinerary of a trip, including segments from multiple carriers and/or other travel services comprising the trip such as hotel and rental car reservations.

A travel agency system 202 may include a web server that provides a publicly accessible website. This website may be configured to provide access to travel planning features, such as the ability to search for travel products matching a travel request. To this end, the travel agency system 202 may provide the traveler with access to data from one or more databases hosted by the GDS 200, carrier systems 201, and the travel agency system 202. In an alternative embodiment of the invention, the travel agency system 202 may be a proprietary system that limits access to travel service providers or travel agents, in which case access may be provided through a private website or other application.

The transaction travel provider system 12 may be in communication with the travel agency system 202 via the network 21 or some other suitable connection. In alternative embodiments of the invention, all or a portion of the travel provider system 2 may be integrated into one or more of the other systems 200, 201, 202. Travelers or travel agents may use the travel agency system 202 to generate and/or search for travel proposals that satisfy a travel request received from the traveler using the travel provider system 2.

The GDS 200, carrier systems 201, the travel agency system 202, the travel provider system 12, and the user devices 2 of the operating environment may be implemented on one or more computing devices or systems, referred to collectively as a computer.

Figure 3:
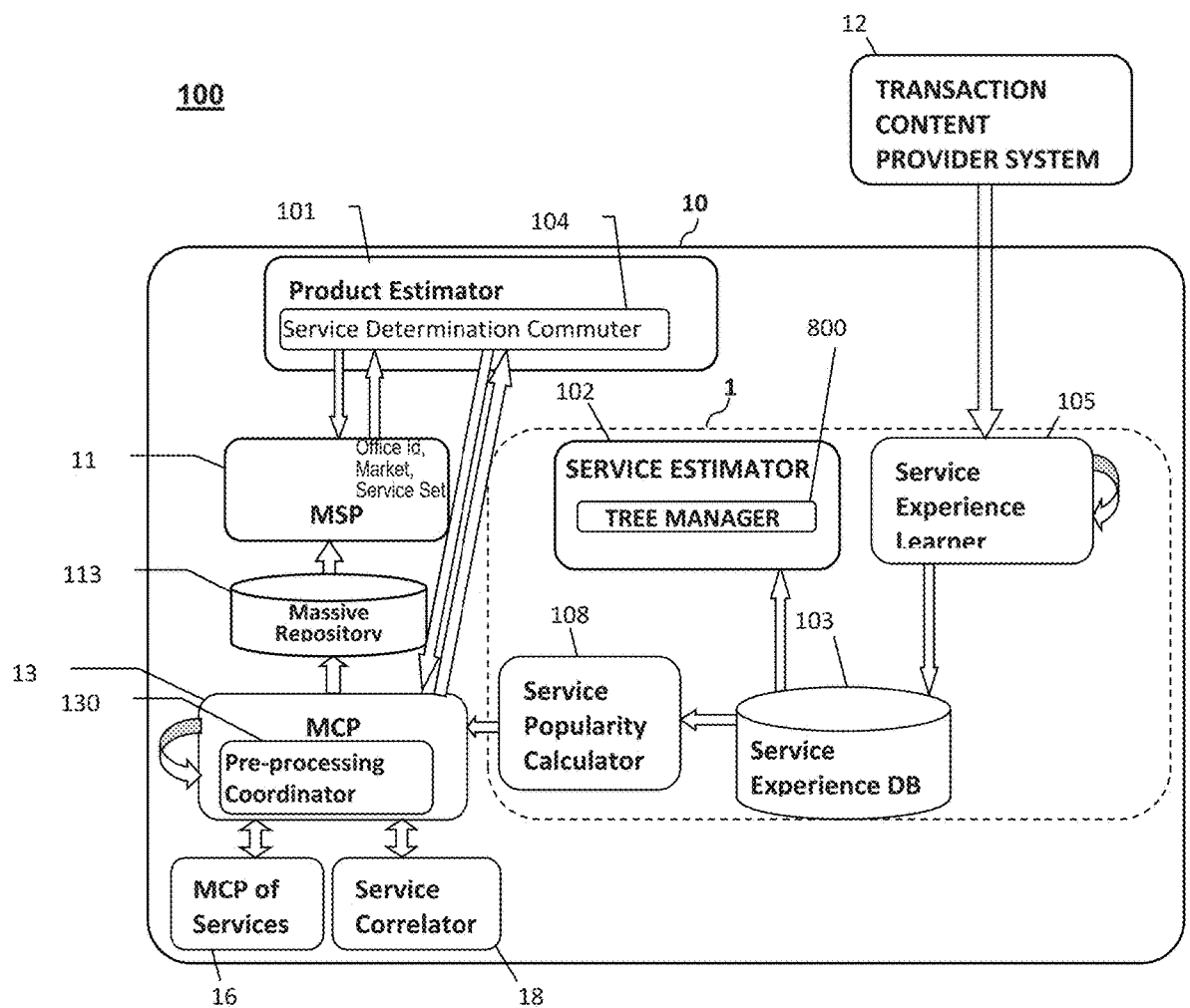
FIG. 3 represents an exemplary implementation of a pre-transaction system in accordance with embodiments of the invention.

FIG. 3 represents an exemplary implementation of the pre-transaction system 10. As shown in FIG. 3, the pre-transaction system 10 may comprise or be connected to a distributed search platform MSP 11 (MSP is the acronym for Massive Search Platform) configured to store pre-computed product values. The MSP platform 11 may comprise one or more distributed machines, each machine comprising one or more computing systems. FIG. 3 only depicts a logical view of the MSP platform while the MSP platform may be physically spread across a set of distributed machines. The MSP platform 11 may be configured to store the best product values of a set of content provider systems 12 providing products for all the days of the year to come, which may include several possible product value per day.

Figure 4:
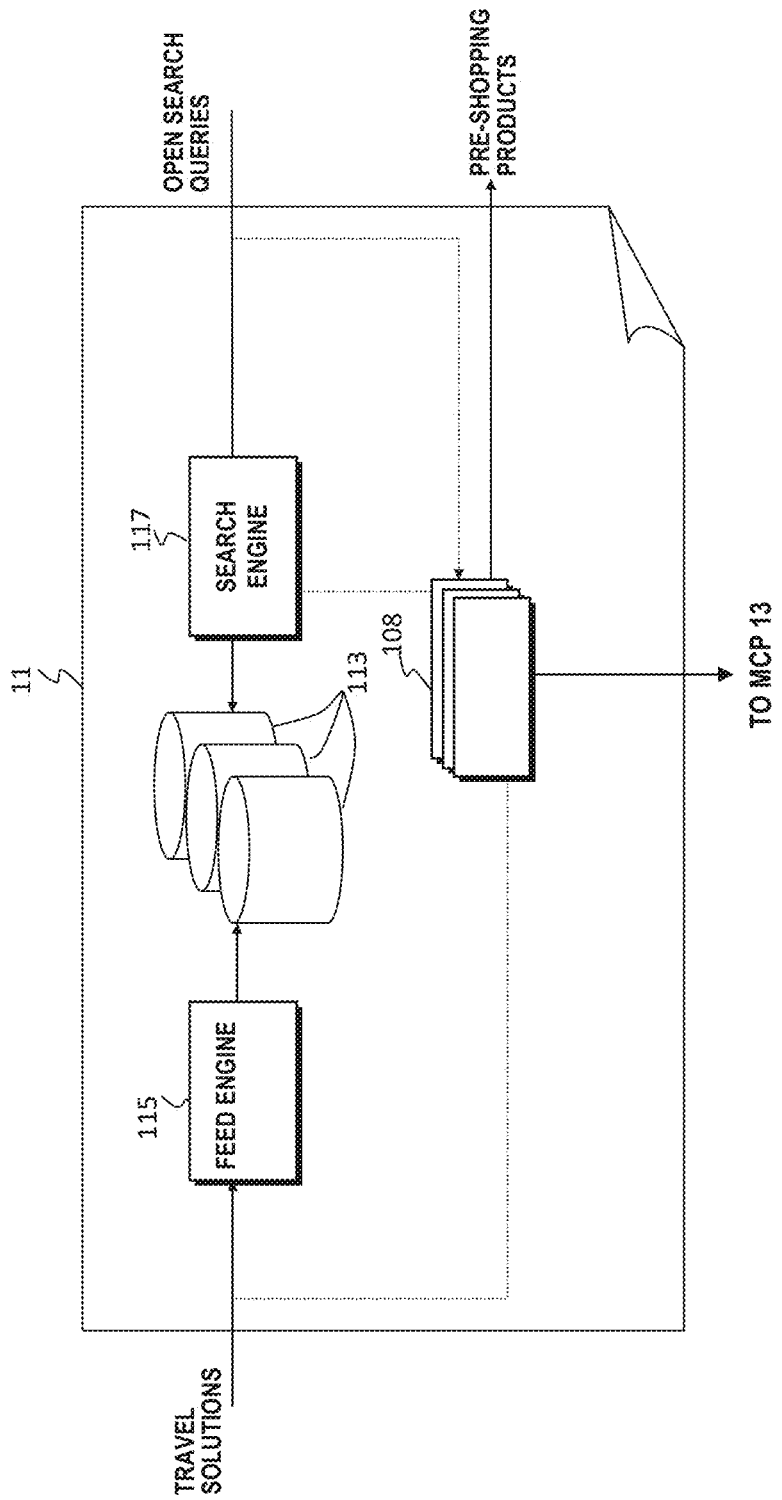
FIG. 4 is a diagram depicting an exemplary Massive Search Platform.

FIG. 4 shows an exemplary MSP platform 11 in the field of travel delivery. In such example, the MSP platform 11 may be configured to store and search travel recommendations, each travel recommendation identifying a candidate product (e.g., flight), the candidate product being associated with a product value (or product "price") according to an exemplary embodiment of the present invention. The stored travel recommendations may be spread over all the machines which are connected to the MSP platform. The MSP platform 11 may comprise one or more databases 113 comprising a Massive repository for storing air travel recommendations which may be logically grouped into groups of recommendations. Although a static view is shown in FIG. 4, the databases 113 may be physically stored across the different machines.

The MSP platform 11 may further comprise a Feed engine 115 configured to index groups of pre-computed air travel recommendations (for example, travels corresponding to a same itinerary defined by a city pair) and store them in one of the machine in the distributed system.

The MSP platform 11 may also comprise a search engine 117 configured to locate groups of data among the physical machines and provide index search information to process the requests originating from user devices 2.

In some embodiments, the MSP platform 11 may comprise a set of business-oriented analysis engines. Each business-oriented analysis engine may be configured to optimize the hardware cost of the platform by determining the optimal number of recommendations to re-compute every day with as accurate as possible pre-computed prices using various process such as feed and search operation analysis, various data such as generate metrics on volatility and quality of data stored in the system. An exemplary implementation of an MSP 11 is described in U.S. Publication No. 2013/0073586, which is incorporated by reference herein in its entirety for all purposes.

Turning back to FIG. 3, in some embodiments, the environment may further comprise a Massive Computation Platform 13 or MCP. The analysis engines of the MSP 11 may transmit data to the MCP 13. The pre-transaction system 10 may comprise or be connected to the MCP 13. The MCP 13 may be configured to compute candidate products (e.g., as flights), and product value information, such as prices, at a massive scale. More specifically, the MCP 13 may be configured to process pre-transaction requests although a limited number of request parameters is provided. In an exemplary application of the invention to the travel field, the MCP 13 may interact with other internal services provided by a GDS 200. The MCP 13 may process request with a high degree of freedom although no mandatory request parameters are specified (e.g., travel date parameter or origin and/or destination location or operating carrier in an exemplary application of the invention to the travel field). The MCP 13 may perform data processing optimization based on a global request analysis.

The MCP 13 may be organized according to a batch model comprising resources which can be dynamically instantiated. The subsystem performs data processing optimization based on a global queries analysis.

In an exemplary application of the invention to the travel field, the MCP 13 may include one or more Massive Masters and a plurality of Massive Working engines. The Massive Masters may be configured to globally analyze the requests which are then decomposed into optimized requests. The optimized requests thus obtained may be then processed by one or more of the Massive Working engines. Each Massive Working engine may return the result of the optimized request processing to the originating Massive Master(s), which assembles the results into candidate products (such as travel solutions), each candidate product including a product value (e.g., travel price).

The MCP 13 may be further configured to perform a global analysis for identifying redundancies (request redundancies) between the received requests to avoid useless re-processing. This may include merging of redundant queries parts depending on predefined performance requirements.

The MSP 11 and the MCP 13 may be part of a distributed search platform connected to a set of transaction travel provider system 12 (such as airline systems, travel agency systems, etc.). Each transaction travel provider system 12 may define which part of their product domain is to be integrated into the search platform. In exemplary application to travel delivery, each transaction travel provider system 12 may then send to the MCP 11 a "massive" query comprising a series of computation orders, each order defining the markets to consider (such as a list of city pairs for all days of the year to come in the travel field) and the type of product recommendations to generate (e.g., for every day, the best recommendations for journeys between 1 and 20 days long). Such orders can be updated by the transaction travel provider system 12 or can serve as a basis for a periodic computation. The MCP 13 may use internal functions of the GDS 200 to compute the requested recommendations, such as a journey retrieval function to retrieve a list of existing flights, a pricing function to find the best combination of fares and products (e.g., flights), an availability function to determine the products available for booking or purchasing.

As the recommendations are generated for the transaction travel provider system 12, the recommendations may be stored in a global cache (Massive Repository 113) of pre-computed travel recommendations, thereby becoming available for future users' search requests. The Massive Repository 113 may be used to store the recommendations computed by the MCP 13. The search amongst the possible solutions is done by the MSP 11.

The pre-transaction system 10 allows a user to submit open requests from a dedicated user interface displayed on a user device. An open pre-transaction request submitted by a user to a pre-transaction travel system may be for example "where can I go?", "what can I do for what I want to spend?". As used herein, an "open" request refers to a request defined by a set of request parameters, a request parameter value being specified by the user only for a limited subset of the request parameters which may comprise only one request parameter. The pre-transaction system 10 may return a response in the form of candidate products that satisfy the open request. The user may select a candidate product on the same search page, without a need to directly connect to the transaction travel provider system and specify all the mandatory request parameters (e.g., destination location, departure date, etc.).

The pre-transaction system 10 according to some embodiments of the invention makes it possible for a user to select a product depending on the estimated availability and price associated with given service(s) at a pre-transaction phase.

In one embodiment, the user may specify the desired services in the submitted pre-transaction request in a "pull" mode. Alternatively, the user may be dynamically returned service recommendations (also referred to as service "recommendations") associated with a product, without specification of a service set by the user, based on pre-computed popularity indicators associated with each service ("push mode").

A product (also referred to herein as a "main product") may be associated with product information identifying the product (for example, a flight travel product is associated with a city pair, departure/arrival date, departure/arrival time), and a product value representing the price at which a product is available for purchase. A product may be further associated with a set of services comprising at least one service.

A service or "ancillary service" (also referred to herein as an "auxiliary product" or "complementary product") related to a given main product may be associated with service information identifying the service, availability information indicating whether the service is available for the product and a service value representing the price of the service.

A "service set" refers to a plurality of services which can be purchased or booked together with a product by a user during a transaction between the client device of the user and a transaction system 12.

The service value (service price) associated with an ancillary service related to a given product may be dependent on the product. For example, the price of an ancillary service related to a travel product may depend on several parameters such as the initial complexity of the number of product price results in the pre-booking system 10 (for example, considering one customer, 500 destinations, 300 dates, 10 stay durations, the number of product prices is equal to 500 destinations×300 dates×10 stay durations=1, 500,000 Prices) and the ancillary service dimension (for example, considering the search of one airline proposing 20 different services and considering that the customer may be interested in any set of services among those 20 services, the corresponding ancillary service dimension may be equal to $2^{20}=10^6$ ancillary services. The combination of the price results dimension (1,500,000) with the ancillary services dimension ($10^6$) leads to $1.5 \times 10^{12}$ prices, in such example).

It should be noted that other parameters related to the travel product associated with an ancillary service may influence the price of the ancillary service, such as, for example, the type of the product to which the ancillary service is related (e.g., equipment, type of plane), the location information of the product (the location information of a product may impact the price), the sale strategy of the product provider (promotion campaign for example), and the category of the product (a category may include for example long flights, business class, economy class).

Computing all the possible prices according to conventional approaches requires a huge number of resources, with a long processing due to data volatility.

The pre-transaction system 10 according to some embodiments of the invention provides service recommendations in the pre-transaction flow while limiting the number of price results to be processed in order to match operational constraints.

In some embodiments, the service estimation engine 1 may be configured to determine ancillary service recommendations for each candidate product returned in response to a product recommendation request.

In some embodiments, the service estimator 102 of the service engine 1 may be configured to pre-compute information related to services such as service availability and service price using information maintained in the service experience database 103. The service estimator 102 may receive the context of a pre-transaction request (e.g., defined by a destination parameter and a date parameter for a travel preprocessing request) and use a search tree structure to determine an occurrence frequency and a service value information (price information) for a specified service set if the pre-transaction request comprises a specification of a service set ("pull" mode), or for a list of service sets (most popular service sets) if the pre-transaction request does not comprise any specified service set ("push" mode).

In a preferred embodiment, the pre-transaction system 10 may also comprise a Service Determination Commuter 104 (also referred to as "service determination commuter") configured to select an ancillary service determination mode in response to a user pre-transaction request. The ancillary service determination modes may include one of the following modes. One mode is a service information extraction mode, such mode selection by the Commuter 104 triggering the retrieval of preprocessed information related to a service set as may be stored in a database 113 by the MSP 11. Another mode is a service determination mode, such mode selection by the Commuter 104 triggering the processing of the pre-transaction request by the Service Estimator 102.

The Commuter 104 enables an optimization of the computational cost of request processing by identifying optimizing the service values (service prices) to be computed with respect to the service values that can be estimated using live traffic. In some embodiments, the Service Determination Commuter 104 may be activated in response to a recommendation request received by the pre-transaction system 10 to determine a service estimation mode. The Service Determination Commuter 104 may be configured to transmit contextual data derived from a received recommendation request either to the MCP 11 or to the service estimator 102 depending on the determined service estimation mode. The Service Determination Commuter 104 may receive back information related to ancillary services the MCP 11 or to the Service Estimator 102, such information being used to generate ancillary service recommendations for each candidate product, the candidate product recommendations being determined by the Massive Search platform (MSP) 13.

In one embodiment, the Massive Search platform (MSP) 13 may comprise a pre-processing coordinator 130 configured to compute requests from real traffic data to feed the massive repository, for all the origin/destination and set of services, at minimum cost.

The service estimation engine 1 may further comprise a learning unit 105 (also referred to as a "Service Experience Learning" unit or "SEL") configured to collect meta-learning data related to auxiliary services availability and value (price) from real-time transactions.

In some embodiments, the service experience database 103 may be organized according to a tree data structure. The Service Estimator 102 may use such tree data structure to search for ancillary services to be recommended to a user in association with a candidate product satisfying the request. The Service Estimator 102 may implement a search algorithm based on such tree data structure, the search algorithm being such that it optimizes the computational costs of the search. The Service Estimator 102 may comprise a tree manager 800 configured to dynamically manage the tree data structure 8. Although the tree manager 800 is implemented in the Service Estimator 102 in FIG. 3, in some alternative embodiments, the tree manager 800 may be implemented as a separate block of the service estimation engine 1 or be implemented in another block of the service estimation engine 1.

Figure 5:
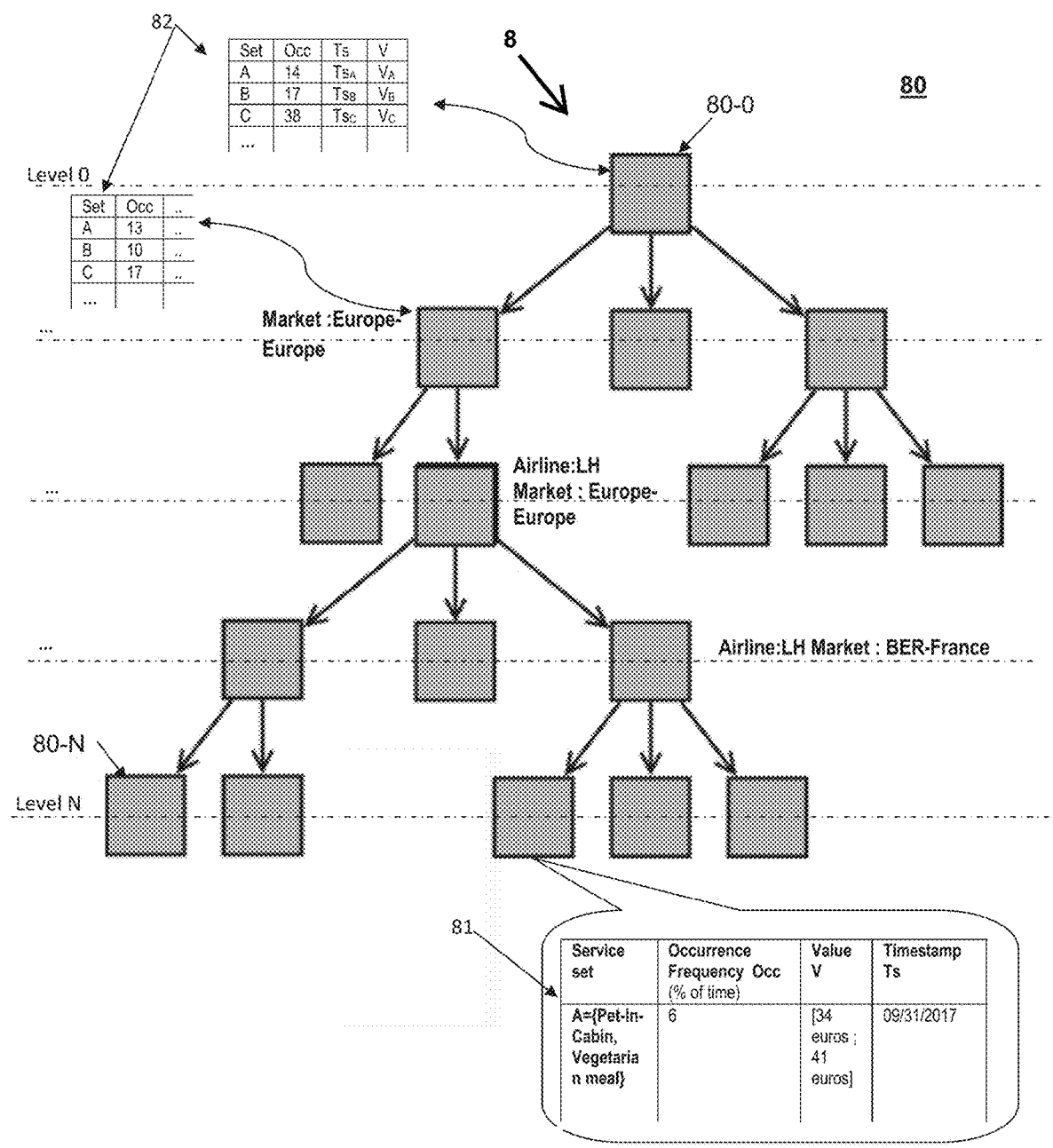
FIG. 5 schematically depicts a tree data structure in accordance with embodiments of the invention.

FIG. 5 schematically depicts a tree data structure, generally indicated by reference numeral 8, according to some embodiments.

The tree data structure 8 (also referred to as a "tree") may comprise a plurality of nodes 80 with each level (also referred to as a "layer") of the tree corresponding to a parameter related to one or more request parameters predefined by the request format, as handled by the transaction content provider systems 12. The tree data structure 8 thus modelizes the different dimensions of a client request.

More specifically, each level of the tree which may be associated with a request parameter combination which may correspond to exactly one request parameter, to several request parameters, to a subset of one request parameter, or to a subset of several request parameters.

Each node at a given level of the tree, with the level being associated with a given request parameter combination, may thus correspond to a value ("node value") of the request parameter combination and may be associated with an integer value ("counter value") representing the number of occurrences of the request parameter combination value among the requests received by the transaction system 12 over a predefined past period T with respect to a processing time. The first node of the tree 80-0 is referred to as the root node. A node which does not have any child node is referred to as a "leaf" node (for example 80-N). Each node has at most one parent node located above it in the tree (i.e., in the previous level of the node). The root node being the highest node in the tree, it does not have any parent node. The depth (also called dimension) of a given node designates the length of the path from the considered node up to the root node of the tree. Each path from the root node to a leaf node represents a set of values corresponding to criteria (or parameters) of a request and thereby represents a past product request. The depth of a leaf node is inferior or equal to the maximal number of request parameters that can be specified in a user request according to the request format defined by the transaction systems 12. A node may be designated by its node value (request parameter combination value). A node 80 may be also referred to hereinafter as $n_i^k$, with i representing the level of the tree (i=0 corresponding to the root node) and k representing the k-th node of level i. The counter value of a node $n_i^k$ will be denoted $c_{n_i^k}$. Thus, the node value $n_i^k$ has been specified $c_{n_i^k}$ times, during the past period. According to the notations used herein, the child nodes of a node $n_i^k$ are designated by the nodes $n_{i+1}^1$, $n_{i+1}^2$, ..., $n_{i+1}^p$, with p representing a number of values specified by users during the past period T for the request parameter combination corresponding to level i–1.

An exemplary client request in the field of travel product provider systems may be, for example, "provide all round trip recommendations to Canada, for a gold tier level pax, departing on Saturday or Sunday with a stay of 2 weeks, with an average monthly temperature at destination greater than 25 degrees, with services={pet in cabin, vegetarian meal}".

In response to the completion of the transaction initiated by such client request, the tree manager 800 may update the tree data structure. To update the tree data structure, the tree manager 800 may be configured for example to divide the received client request into the following tokens: "Round trip", "1 gold tier level pax", "Saturday or Sunday departure", "2-week stay", "North America destination", "Canada destination", "Canada destination with temperature >20 degrees", "Temperature >25 degrees", "Services={pet in cabin, vegetarian meal}".

The tree manager 800 may then update the values of the different levels, from these tokens.

As shown by this example, the tree levels may either exactly match one request criterion (A, C, D, E, H, I), match several request criteria (B), match a subset of one request criterion (F), or match a subset of several request criteria (G).

The tree data structure 8 thus captures the context of transaction user requests of the live traffic (also called "real-time" traffic) at the transaction system 12 within the nodes and the branches of the tree. The tree data structure 8 may be further configured such that the leaf nodes of the tree are associated with a service set parameter representing a set of services purchased in association with the product defined by the upper levels. Each leaf node of the tree may thus correspond to a set of services (comprising one or more services) purchased in the past period T together with the product defined by the path from the root node to the node preceding the considered leaf node. The set of services may be defined by a combination of services {[service 1] and [service 2] and . . . [service p]}.

Ancillary service estimation may be all the more accurate as the tree depth increases.

In some embodiments, additional information may be associated with each node. Such additional information may be used to maximize factorization and accordingly the time required to perform a search using the tree.

In one embodiment, a set of tree criteria may be dynamically added or removed based on the number of child nodes.

The tree data structure 8 may be configured so that the upper the level of the tree, the more discriminative the request parameter associated with the level. This limits the computational cost of a search using the tree.

For example, in an application of the invention to travel product delivery, the tree data structure may for example comprise: a first level (i=1) corresponding to the mainland pair of a travel request defined by an "origin mainland" and a "destination mainland" (e.g., a value of the mainland pair may be "Europe, Europe"); a second level (i=2) corresponding to the journey controlling carrier(s) of the travel parameter (e.g., a value of the journey controlling carrier may be "LH", standardized name for Lufthansa); a third level (i=3) corresponding to the location pair of a travel request defined by an "origin location" and a "destination location" (e.g., a value of the country pair may be "BER"—France, with BER being the standardized name for BERLIN); and a fourth level (i=4) corresponding to the services set associated with a product defined by the previous level node values (e.g., a value of the service set may be a ["pet in cabin"] service and ["vegetarian meal"] service).

In some embodiments, each tree leaf $n_L^k$ of the tree data structure corresponding to a previously requested service set may additionally comprise a counter $c_{n_L}^k$ defining the number of times the service set value has been requested to the transaction content provider system 12 by a user during a past period T; and/or a plurality of service set values. Each service set value (also referred to as "service set price") may comprise price information related to the price at which the corresponding service set, denoted {[service 1] and [service 2] and . . . [service p]}, has been purchased during a purchase transaction related to the product defined by the path from the root node to the leaf node $n_N^k$ during the past period T; in one embodiment, each service set value (service set price) may comprise a list of price values representing the list of price values at which the service set has been purchased over the past period. In another embodiment, each service set value (service set price) may comprise a list of price ranges corresponding to the range of prices at which the service set value has been purchased during the past period, the range of price being defined by a lower threshold representing the lower purchase price of the service set and an upper threshold representing the upper purchase price of the service set.

The following description of some embodiments will be made with reference to leaf nodes comprising each a service set value in the form of a value range (or price range).

Each leaf node $n_L^k$ of the tree data structure corresponding to a given service set may further comprise a timestamp representing the time of the last update of the leaf node, that is the last date at which a price has been determined for the service set associated with the leaf node (the timestamp may include the date and time of the update).

FIG. 5 shows exemplary data 81 comprised at each leaf node associated with an exemplary set of service A={Pet-In-Cabin, Vegetarian meal} including an occurrence frequency: 6% (service set request 6% of time for the request defined by the path of the leaf node); a price range: [34 euros; 41 euros]; and a timestamp Ts: Sep. 31, 2017.

In some embodiments, each node 80 of the tree data structure (different from the leaf nodes) may be further associated with aggregated leaf node data 82 which may be locally stored at the node or stored in a storage unit connected to the tree manager 800. Although FIG. 5 shows exemplary leaf node data 82 for only two nodes 80, for simplification purpose, similar data can be comprised at the other nodes of the tree (different from leaf nodes). The leaf node data comprise aggregated data from the leaf nodes located in the subtree defined by the node 80 (below node 80). The leaf node data thus comprise aggregated data related to the service set associated with the subtree defined by the node 80 such as the following data for each service set: an aggregated occurrence frequency Occ, an aggregated value information V (also referred to as an 'aggregated price information') such as for example an aggregated value range, and possibly an aggregated timestamp representing the last update of the service set.

For a given service set, the aggregated occurrence frequency refers to the sum of the occurrence frequencies associated with the service set over all the leaf nodes located below node 80.

In one embodiment, the aggregated value information V comprised in a leaf node may be an aggregated value range (also referred to as an 'aggregated price range') denoted [Pmin, Pmax], defined for the service set associated with the leaf node. The price range may be defined by a lower threshold Pmin and an upper threshold Pmax, the lower threshold Pmin representing the lower value (price) assigned to the service set among the values (prices) associated with the service set in the leaf nodes located below the node 80 and the upper threshold Pmax representing the upper value assigned to the service set among the values (prices) associated with the service set in the leaf nodes located below the node 80.

It should be noted that the invention is not limited to an aggregated value information V implemented as an aggregated value range [Pmin, Pmax]. Alternatively, the aggregated value information V may be an average value (also referred to as an 'average price'), a median value (also referred to as a 'median price'), or a range based on unitary values (also referred to as 'unitary prices') in which extreme values are removed (for example, the 0-10 and 90-100 percentiles can be removed), or a sorted list of values (prices) comprising values sorted by decreasing occurrence frequencies.

In still another embodiment, the aggregated value information V stored by a leaf node may comprise all possible values (or 'prices') in association with their number of occurrences.

The following description of some embodiments of the invention will be made with reference to an aggregated value information V implemented as an aggregated value range [Pmin, Pmax], for illustration purpose only.

For a given service set, the aggregated timestamp value refers to the more recent timestamps among the timestamps associated with the service sets which correspond to the leaf nodes below the node 80.

By aggregating at each node of the tree data related to the service sets associated with the leaf nodes located below the node, the computational costs of ancillary service estimation can be reduced.

In one embodiment, in response to a pre-transaction request specifying a given service set, the service estimator 102 may be configured to browse the tree data structure 8 according to a tree search algorithm (such as for example a Best-First search algorithm) to determine a matching node having a path in the tree matching the parameters of a pre-transaction request, and search for a leaf node in a subtree of the matching node that matches the given service set and that has an occurrence frequency satisfying a threshold condition at the lowest possible level of the tree data structure. The product associated with the given service set is thus defined by the path from the root node to the matching node. The Service Estimator 102 may determine the service value information from the data comprise in the determined leaf node. In one embodiment, the occurrence frequency of a leaf node may be determined to satisfy the threshold, if the occurrence frequency is greater or equal to a predefined threshold.

More specifically, the service estimator 102 may be configured to search for a leaf node $n_L^k$ in the subtree of the matching node that matches the given service in the last possible level L of the tree data structure, and having enough occurrence (i.e., the leaf node has an occurrence frequency satisfying the threshold condition).

In one embodiment, to determine the service value information, if a tree leaf $n_L^k$ in a level L (with L≥N) is determined to match the given service set {[service 1] and [service 2] and . . . [service p]}, the Service Estimator 102 may be configured to determine the range of service set values (service set prices) associated with the service set {[service 1] and [service 2] and . . . [service p]} in the tree leaf $n_l^k$ during the past period T.

The range of service set values may thus correspond to the range of prices paid by users for this product during the past period T.

For example, a price range of [34 Euros-41 Euros] may be associated with the service set {[pet in cabin" service] and [vegetarian meal service]}.

In some embodiments, the counter $c_{N_L}^k$) associated with a leaf node of the tree may be used by the Service Estimator 102 to derive a statistical value representing the occurrence frequency of a service set over the past period T. For example, an occurrence frequency of the service set {[pet in cabin" service] and a [vegetarian meal service]} may be equal to 6% of time.

In one embodiment, a tree rebuilding algorithm (also called "balancing" algorithm) may be applied to the tree data structure 8 to obtain an as balanced as possible tree data structure starting from any node. A tree is balanced if, for each node of the tree, the heights of the left subtree and right subtree heights differ by at most one, and the left subtree is balanced, and the right subtree is balanced.

Turning back to FIG. 3, the Service Experience Learner 105 may be configured to capture the availability status and service value of each ancillary service associated with the products offered by the transaction system 12 using real-time transaction data. The Service experience learner 105 may store the collected information in the form of the tree data structure of the Service Experience database 103. In some embodiments, the Service experience learner 105 may be configured to collect data on service requests, when the MSP 11 fails to provide information.

The Service experience learner 105 may be scheduled to self-reorganize the Service Experience database 103 according to a predefined period or automatically in response to the detection of an update condition.

In one embodiment, the Service Experience Learner 105 may collect information from a fare review step of the transaction flow performed by the transaction system 12. As used herein, the fare review refers to the step prior to the validation of a transaction by a user during which a user is requested to review the fare information related to a product purchase (prior to the step where a user is requested to enter user personal information). In such a phase, the context of a transaction request is known at the transaction system 12, thereby enabling to use the parameter of the request to update the tree data structure in the service experience database 103. This further enables collecting information late enough in the transaction flow to have a sufficiently specified product (for example a fixed itinerary for a travel product) and thus gather accurate service information. Further, this enables to collect information early enough in the transaction flow to have a maximum of transaction traffic.

For each transaction request submitted to the transaction system 12, the Service Experience Learner 105 may be configured to browse the tree of the Service Experience Database 103 from the root node to the leaf node, determine if the parameters of the request match a node value at each level until the last node before the leaves is reached (i=N−1), the service experience learner 105 being configured to update a node if a match is found or create a new node if parameter values are not created in the tree.

In particular, the service experience learner 105 may be configured to increment the counter associated with a node value of the tree, in response to finding a match between a parameter (e.g., airline website, controlling carrier, location pair, etc.) of the request and the node value, thereby allowing storage of the full context in the tree.

In one embodiment, to determine if a match exists in the tree for a parameter (e.g., airline website, controlling carrier, location pair, etc.) of a given transaction request submitted to the transaction system 12 specifying a given product and a given service set, the service experience learner 105 may determine if a leaf already exists for the given service set in the tree which has an associated path corresponding to the parameters of the request related to the product. If a match is found, the node corresponding to the leaf may be updated by incrementing the counter associated with the leaf. The Service Experience Learner 105 may be also configured to store additional data related to the service set such as the full context and one or more service set values (e.g., elementary price for each service [service k] of the service set). If no match has been found between a leaf of the tree and the service set specified in the transaction request, the Service Experience Learner 105 may create a new leaf (new node) for the service set of the transaction request, set the counter of the created node to 1. It may further store in the newly created lead additional data related to the service set such as the full context and one or more service set values (e.g., elementary price for each service [service k] of the service set).

In one embodiment, the Service Experience Learner 105 may launch a tree checking process to check the configuration of the tree and identify if the tree is unbalanced, according to a predefined checking period, such as every M updates of the tree. The checking process fails when it is detected that the tree is unbalanced. In some embodiments, a tree rebuilding algorithm may be applied to balance the tree.

In one embodiment, the tree checking period may be predefined by a system administrator. In some embodiments, the tree checking period may be updated during operation of the Service Experience Learner 105 or dynamically adjusted depending on update criteria. If the Service Experience Learner 105 detects that the tree is unbalanced, it may apply a balancing algorithm to reorganize the tree.

In some applications of the invention, the Massive Computation Platform MCP 13 cannot pre-process all ancillary service possibilities due to the complexity of the computation. To limit the computational cost of ancillary service information (service availability, service price), the service estimation engine 1, according to some embodiments, may comprise a Service Popularity Calculator 108. The Service Popularity Calculator 108 may be configured to only compute recommendations for ancillary services related to each candidate product among a subset of services ("popular service subset"), each service of the popular service subset being selected based on a popularity indicator computed for the service which represents the likelihood for the service of being requested by users.

The Service Popularity Calculator 108 may be configured to receive the context of the pre-processing request (also referred to as a "recommendation" or "pre-transaction" request), and use the tree data structure to determine the most requested service sets over a past period (most popular services).

The Service Popularity Calculator 108 may use the Service Experience Database 103 to determine the popularity indicators associated with each service. In some embodiments, the Service Popularity Calculator 108 may use criteria (also referred to as "input context" for the Service Popularity Calculator 108) related to the products specified for each transaction system 12 to determine the popularity indicators (e.g., criteria related to dates, and/or stay duration, and/or airline, and/or city pair, etc. for a travel product).

Accordingly, the popularity indicator of a service may be set to a high value if the related product is frequently requested during a given time period.

In one embodiment, considering n possible transactions types t1, ..., tn for requesting a service set S, the popularity indicator may be determined from the parameter Popularity (S) defined as:

$$\text{Popularity}(S) = \Sigma_{i=1}^{i=n} w_i occ_i \qquad (1)$$

In formula (1), $w_i$ designates the weight associated to ti, $occ_i$ designates the occurrence frequency of requests having the transaction type $t_i$ and having requested S over period of time.

For example, considering a travel provider system, the transaction types may include a preshopping request type $T_1$; a shopping request type $T_2$; a pricing request type $T_3$.

As used herein, a "node context" for a given node refers to the information defining the path of the node from the root node to the given node.

For each input context defined by the request criteria of a received user request, the Service Popularity Calculator 108 may browse the tree data structure 8 of the Service Experience Database 103 tree starting from the root node according to a tree search algorithm to find a node Nd ("current node") at the last possible level of the tree having a child node matching the request criteria (first condition) and a leaf node below the child node associated with a service set having an occurrence frequency which is at least equal to a predefined threshold Q (second condition).

The Service Popularity Calculator 108 may be configured to determine then the frequencies of occurrences $c_{n_i}^k$ of all the service sets (Pull mode) or of the specified service set (Push mode) from the selected current node Nd. In some embodiments, the Service Popularity Calculator 108 may send the occurrence frequencies of the service set(s) thus determined to the MCP 11.

The MCP 11 may be configured to refine the input context by adding the service sets determined by the Service Popularity Calculator 108 and the occurrence frequency associated with each determined service set(s).

The Service Estimator 102 may be configured to determine ancillary services using historical data stored in the Service Experience Database 103 for each recommended (or candidate) product delivered by a transaction content processing system 12.

The Service Estimator 102 may receive from the Service determination Commuter 104 an input, in response to a service estimation mode being activated by the Service determination Commuter 104. The input sent by the Service determination Commuter 104 to the Service Estimator 102 may comprise contextual data (such as Office ID, market for an exemplary application of the invention to travel delivery) derived from a recommendation request submitted to the pre-transaction system 10, and possibly information related to an ancillary service set comprising at least one service, if a "pull mode" is activated by the user (the user thus specifies in the recommendation request that he or she wishes recommendations for candidate product associated with the ancillary service set). Alternatively, the processing of the Service Estimator 102 may be triggered dynamically in push mode, without any service set specification by the user.

Figure 6:
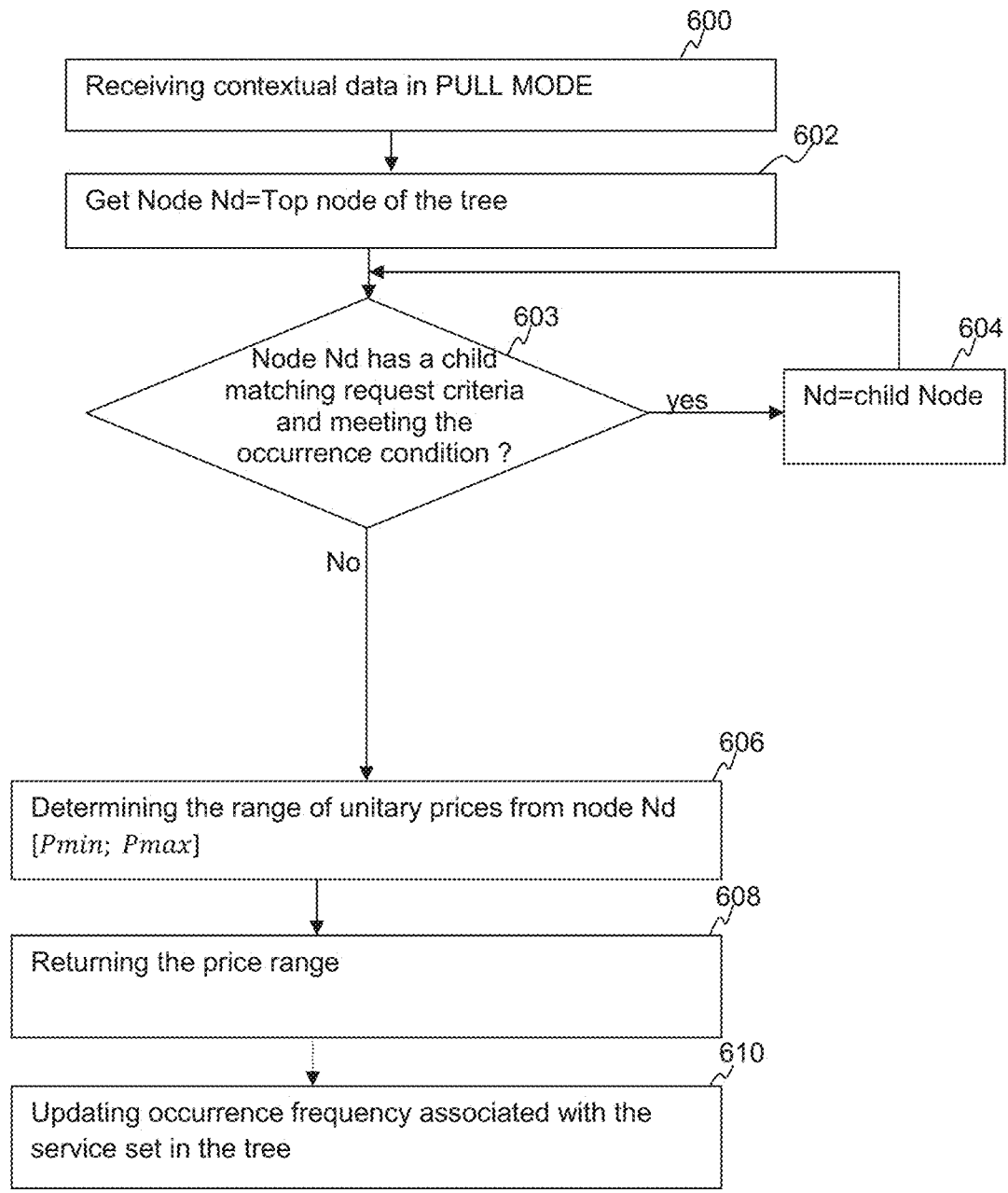
FIG. 6 is a flowchart depicting the process of determining a service set in accordance with pull mode embodiments of the invention.

FIG. 6 is a flowchart depicting the process of determining a candidate service set recommendation, which may be implemented by the Service Estimator 102, according to a pull mode embodiment.

In step 600, an input is received from the Service Determination Commuter 104 comprising contextual data defining parameters of a requested product and specification of a service set derived from a recommendation request submitted by a user device to a pre-transaction processing device 10.

In step 602, the tree data structure 8 of the Service Experience Database 103 is browsed using a tree search algorithm starting from the root node until a node Nd is reached that satisfies the set of node conditions (block 603) including:

the first condition which is met if a child node of the node Nd has a context matching the input context, or in other word if such child node matches the criteria of the request received from the user (input request); and the second condition which is met if the child node of the current node Nd has the specified service set, and the service set is associated with a occurrence frequency equal or greater to a minimum number Q.

In a PULL mode embodiment, the request criteria used to evaluate the first condition include the service set specified by the user.

The parameter Q designates the minimum number of occurrences. The parameter Q may be predefined, configurable by an administrator, or dynamically updated.

In an embodiment, to test the first condition, the leaf node data associated with each node may be used to optimize the cost of the search, the leaf node data 82 providing data related to each set of services associated with a leaf node in the subtree defined by a given node in the tree (for example, for each service set associated with a leaf node in a subtree of the node, the occurrence frequency Occ, price range V, timestamp Ts). In such embodiment, each parent node aggregates the service set data stored in the leaf nodes located below the parent node.

If the current node Nd satisfies the first and second conditions, the browsing of the tree is continued (step 604).

Otherwise, if the first and second conditions are not satisfied, the last browsed node Nd is selected, and in step 606, the range of unitary prices [Pmin; Pmax] of the requested service set may be determined from the service value information associated with the service set in the aggregated data associated with node Nd or retrieved from a storage memory if the range has been pre-computed. Each range of unitary prices [Pmin; Pmax] may comprise a lower limit Pmin representing the minimum price of the elementary services constituting the requested service set and an upper limit Pmax representing the maximum price of the elementary services constituting the service set.

In step 608, the range of unitary prices [Pmin; Pmax] determined for the requested service set from the tree data structure 8 may be returned to the Service Determination Commuter 104.

The method may comprise a further step 610 of incrementing the occurrence frequency associated with the service set in the corresponding leaf node, and of updating accordingly the aggregated data associated with nodes in the upper levels of the tree of such leaf node.

Figure 7:
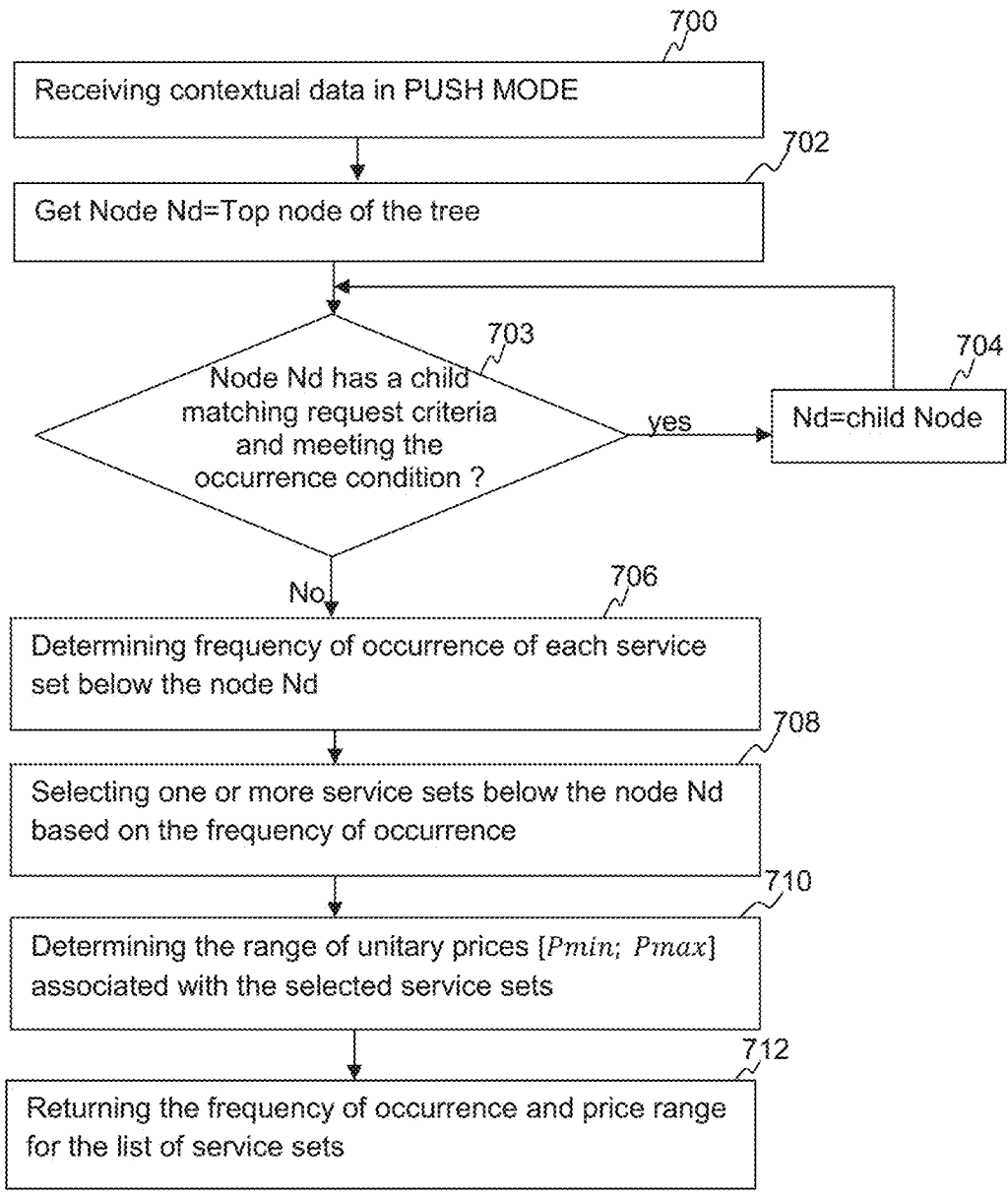
FIG. 7 is a flowchart depicting the process of determining a list of service sets in accordance with push mode embodiments of the invention.

FIG. 7 is a flowchart depicting the process of determining a list of candidate service set recommendations, which may be implemented by the Service Estimator 102, according to a push mode embodiment.

In push mode, no service set is specified in the recommendation request submitted to the pre-transaction system 10.

Push modes parameters may be predefined such as the maximal number of service sets returned to the user.

In step 700, an input is received from the Service determination Commuter 104 comprising contextual data defining parameters of a requested product derived from a recommendation request submitted by a user device to a pre-transaction processing device 10, without specification of any service set (PUSH MODE). The input may further comprise the expected number N of service sets to be pushed.

Steps 702 to 704 are similar to steps 602 to 604 of FIG. 6. However, as no service set is specified in the input request in push mode, the criteria of the request used to determine a child node in step 702 (first condition) do not include a specified service set.

Accordingly, in step 702, the tree data structure 8 of the Service Experience Database 103 is browsed using a tree search algorithm starting from the root node until a node Nd is reached that satisfies the set of node conditions (block 703) including the first condition which is met if a child node of the node Nd has a context matching the input context, or in other word if such child node matches the criteria of the request received from the user (input request); and the second condition which is met if the child node of the current node Nd has at least N service sets associated with an occurrence frequency equal or greater to a minimum number Q.

This enables selecting the node Nd that satisfies the first and second conditions at the lowest possible level of the tree.

If the first and second conditions are not satisfied, the last browsed node Nd satisfying the two conditions is selected.

In step 706, the frequencies of occurrences of the service sets associated with the leaf nodes located below the selected node Nd may be determined, for example using the leaf node data 82 associated with node Nd. In some embodiments, if two different service sets have the same occurrence frequency, the timestamp associated with the service sets may be used to select the service set having the later timestamp (for which a price value have been more recently determined).

In step 708, one or more service sets may be selected based on the occurrence frequency associated with the service sets. This provides a filtered list of service sets (most popular service sets). In an embodiment, step 708 may comprise selecting the service sets associated with an occurrence frequency superior or equal to a predefined threshold.

In step 710, the range of unitary prices [Pmin; Pmax] associated with each service set selected in step 708 may be determined, for example from the leaf node data 82. Each range of unitary prices [Pmin; Pmax] comprises a lower limit Pmin representing the minimum price of the service set and an upper limit Pmax representing the maximum price of the service set over the past period T.

Instead of determining the occurrence frequencies and price ranges in step 706 to 710 from the leaf node data 82 associated with the current node Nd, in some embodiments, the tree may be browsed a number of times, in particular for each service set, to determine such information directly from the leaf nodes with more accuracy.

In step 712, the occurrence frequencies and the range of unitary prices [Pmin; Pmax] determined for each service set of the list of selected service sets may be returned to the Service Determination Commuter 104. The most popular ancillary services and the service price estimations associated with such ancillary services are thus determined in the input context.

While in the pull mode embodiment of FIG. 6, the occurrence frequency and the price range are returned for only one service set corresponding to the requested set, in the push mode embodiment represented in FIG. 7, the occurrence frequency and the price range are determined for the selected list of service sets.

Figure 8:
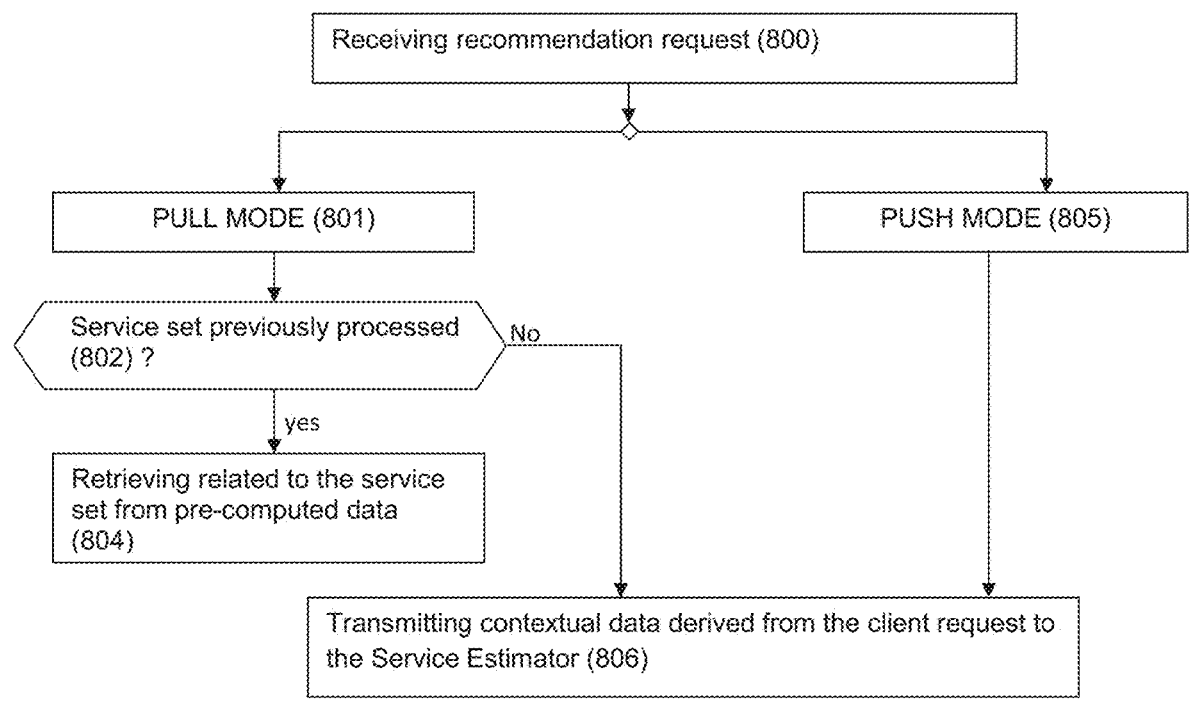
FIG. 8 is a flowchart depicting the process of commuting service estimation mode in accordance with embodiments of the invention.

FIG. 8 is a flowchart depicting the process of commuting service estimation mode, which may be implemented by the service determination Commuter 104, according to some embodiments.

In step 800, a client request (also called "pre-transaction" or "recommendation" request) is received by the pre-transaction system 10 from a user device 2.

If the client request is received in pull mode (block 801), i.e., the recommendation request does specify a particular service set, in step 802, it is determined if the specified service set has already been processed for similar products using parameters related by the recommendation request (for example in an application of the invention to travel product, it may be determined if the specified service set has already been processed for a same route (defined by an origin/destination)). In one embodiment, this step may be performed by a pre-processing coordinator 130 provided in the MCP 11 in response to a call by the Service Determination Commuter 104.

If it is determined that the service set has already been requested, in step 804, data related to the service set may be retrieved from the pre-processed (or pre-computed) data using the Massive Search Platform (MSP) 13 or from the Service Estimator 102.

Otherwise, the service contextual data related to the recommendation request and the specified service set may be sent to the Service Estimator in step 806.

If the recommendation request is received in push mode (block 805), i.e., the recommendation request does not specify any service set, in step 806, the Service Estimator 102 may be called. This includes transmitting the service contextual data related to the recommendation request and the specified service set to the Service Estimator 102. The Service Estimator 102 may determine the most popular ancillary services and service estimated prices associated with the ancillary services, as described in connection to FIG. 6.

In one embodiment, the pre-preprocessing coordinator 130 may be further called to determine if the services sets returned by the Service Estimator 102 (most popular ancillary services) have already been pre-processed using real-time data (by MCP 13) in the example of a travel product. If so, the estimated prices associated with the service sets returned by the Service Estimator 102 may be overridden with such pre-processed prices (accurate service prices).

Figure 9:
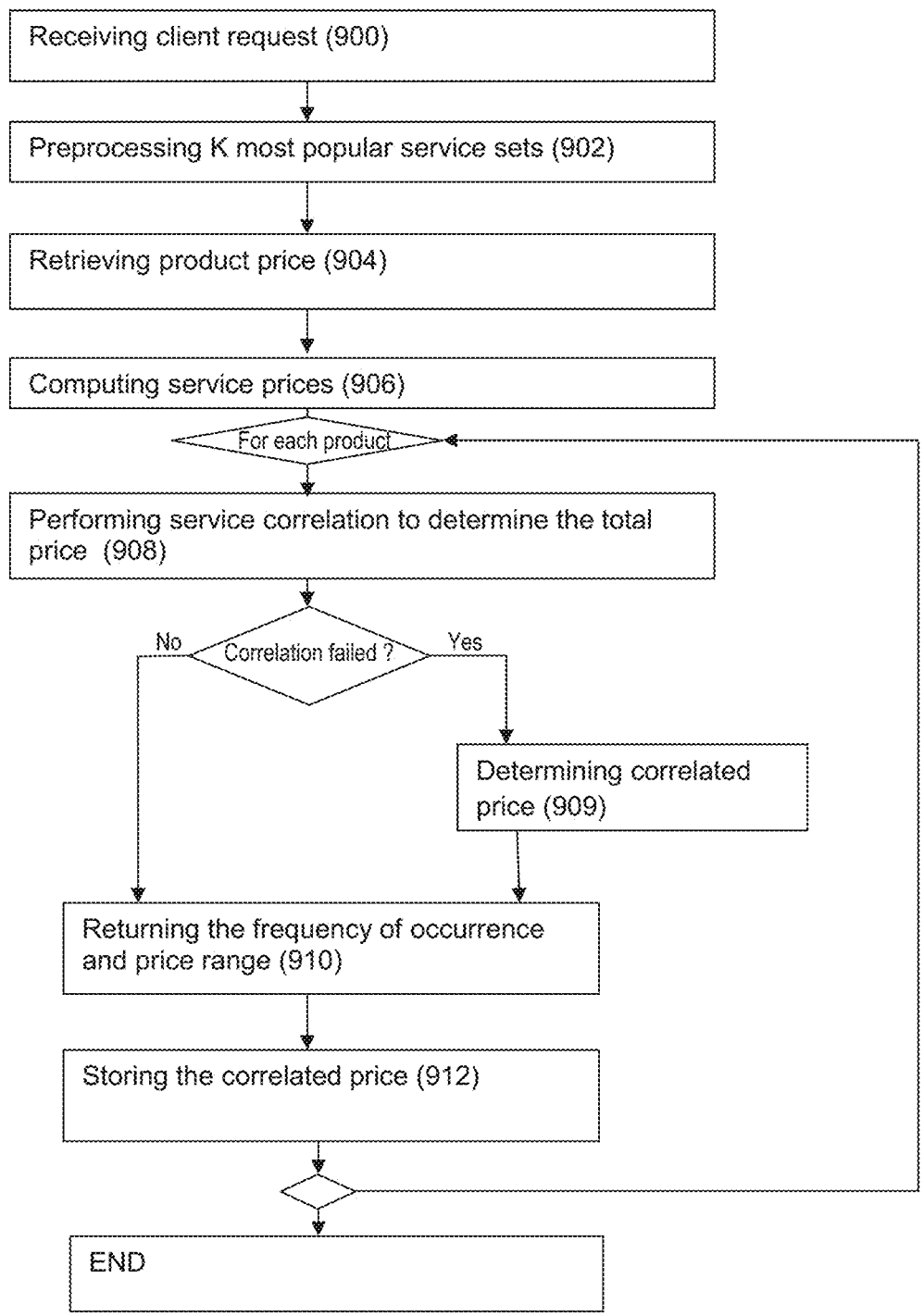
FIG. 9 is a flowchart depicting the process of pre-determining services sets in accordance with embodiments of the invention.

FIG. 9 is a flowchart depicting the process of pre-determining services sets which may be implemented by the pre-preprocessing coordinator 130 of the MCP 13 to feed the massive repository 113, for all the origin/destination and set of services, at minimum cost, according to some embodiments.

In step 900, a transaction request (client request) is received by a transaction system 12. The set of j mandatory request parameters predefined for the transaction request format (e.g., route, departure date, stay duration for a travel request) and defined by a j-uplet is assumed to be known (it may be filled by the user or the transaction system 12). The client request may further comprise ancillary service sets to be preprocessed, for each of the j request parameters.

In one embodiment, a preprocessing of the K most popular service sets may be determined by the Service Popularity Calculator 108 using the popularity indicators determined for each service set, for all of the above j-uplet in step 902. Alternatively, preprocessing may be performed for a specific ancillary service set specified in the transaction request by a client.

In order to minimize the cost of the computation, the pre-processing may comprise the following steps. In step 904, the Massive Search Platform (MSP) 13 may be called to retrieve the product value (price) associated with the products (e.g., itineraries for a travel request) identified by the client request, without taking into account service values (service price). In step 906, the service MCP 16 may be called to compute the service prices for all the services specified in the client request, in a standalone mode (independently of the product). In step 908, for each product price and for each service requested by the client request, a service correlation step may be performed to identify if the services priced in standalone mode can be added to the price of the product. If so, the total price of the product (comprising the main product and the service set) may be returned in step 910. In some embodiment the total price thus determined may be stored in the massive repository 113, in step 912. In step 909, if the services priced in standalone mode cannot be added to the price of the product (service price applicable to the product pricing), a correlated pricing may be determined (for the product and the service set) by the product MCP 13. The result thus obtained may be stored to the massive repository 113 in step 912.

The process of performing service correlation may be performed by a Service Correlator 18 (shown in FIG. 3). The Service correlator 18 may be configured to determine if a standalone service price can be attached to a product price (e.g., itinerary price). The Service correlator 18 may provide a correlation service to the pre-processing coordinator 130.

Figure 10:
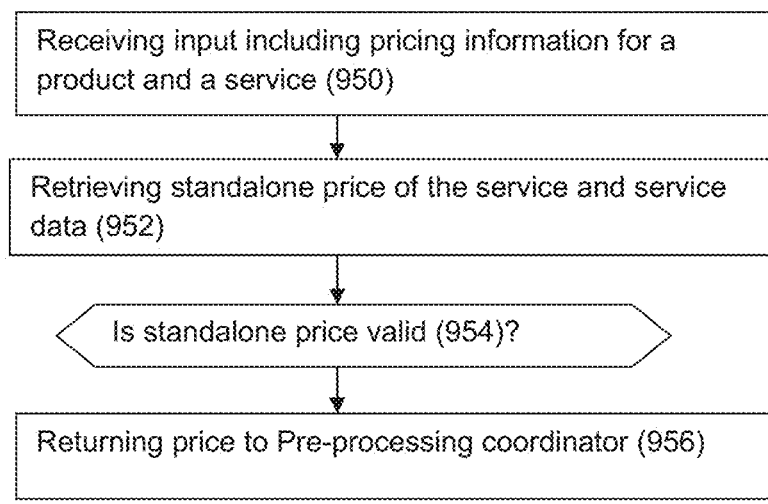
FIG. 10 is a flowchart depicting the process of correlating in accordance with embodiments of the invention.

FIG. 10 is a flowchart depicting the process of correlating services implemented by the Service Correlator 18, according to some embodiments.

In step 950, an input is received which includes pricing information associated with a product (e.g., full itinerary) and a service to be attached to the product pricing.

In step 952, the result of MCP of services 16 is used to fetch (or retrieve), for the requested service, the standalone price of the service and additional data associated with the service.

In step 954, it is determined if the price associated with the service is applicable to the product pricing (i.e., valid) using an applicability flag pre-computed for the service (the applicability flag may be also called "validity flag"). If so, the price of the service is returned to the Pre-processing coordinator 130 in step 956. Otherwise, if it determined that the service is not applicable to the product pricing, no price is returned to the Pre-processing coordinator 130.

The MCP of services 16 may be configured to determine an applicability flag in association with each service in a pre-processing phase, in a "standalone" operational mode (independently of any recommendation request, and thus independently of any product context). The Service Correlator 18 may use such applicability flag to determine applicability of a service price to a product pricing (as described in connection with FIG. 9).

In one embodiment, the MCP of services 16 may comprise a service pricing database for storage of standalone service pricing and the applicability flags associated with services.

For each standalone service pricing requested by the pre-processing coordinator 130, the MCP of service 16 may be configured to compute the price of the service, using predefined rules and/or assumptions. The MCP of service 16 may store the standalone price determined for the service in association with the service in the service pricing database of the MCP of services 16, and possibly additional constraints related to the service (such as for example "Geography", "Cabin", "Fare", "Flights restriction" in an application of the invention to travel delivery). Such additional constraints can be used to determine a matching with product prices.

The pre-transaction system 10 according to the embodiments of the invention enable delivery of ancillary service recommendations to client devices, in a pre-transaction phase, while limiting the computational costs required to produce such service recommendations. This thereby enables a reduction of user requests submitted to the transaction system 12, the user gathering enough information during the pre-transaction phase to better define the requests to be submitted to the transaction system 12. Accordingly, the end user does not need to go back and forth in the transaction flow implemented by the transaction system to detect if a desired service is available and/or if a desired service is too expensive. The load of the transaction system 12 may be thus significantly reduced. Further, the pre-transaction system 10 according to the embodiments of the invention is capable of providing accurate information to the user in the pre-transaction phase.

Figure 11:
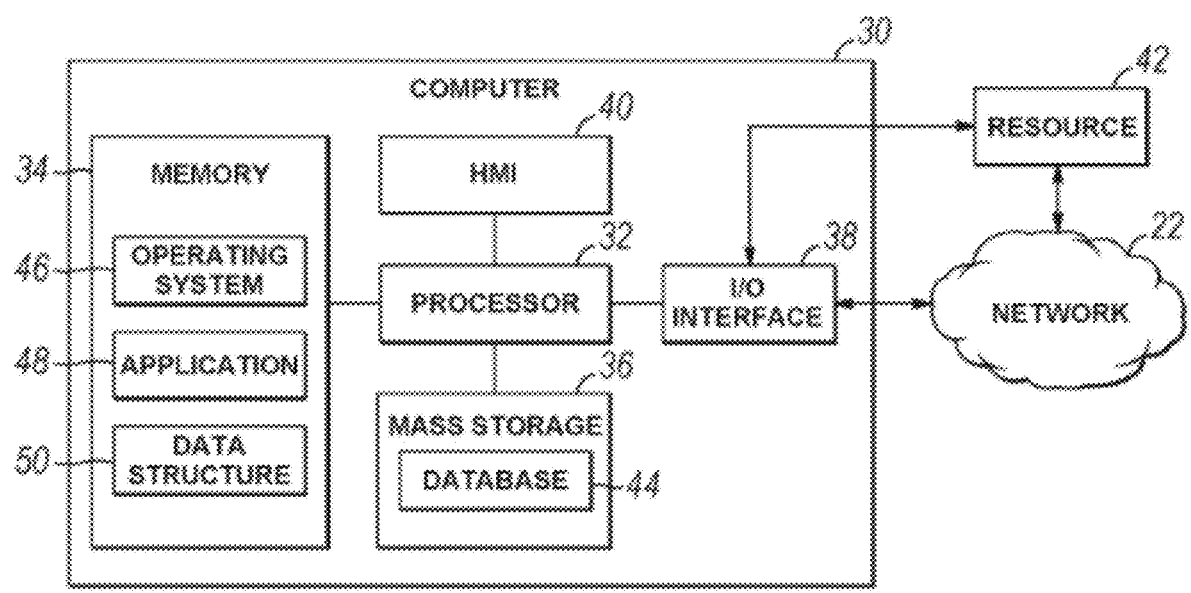
FIG. 11 represents an exemplary operating environment in accordance with embodiments of the invention and in which one or more components of the pre-transaction system may be implemented.

Referring now to FIG. 11, the different blocks of the pre-transaction system 10 and the user devices 2 of the operating environment may be implemented on one or more computing devices or systems, referred to collectively as a computer, such as computer 30. The computer 30 may include a processor 32, a memory 34, a mass storage memory device 36, an input/output (I/O) interface 38, and a Human Machine Interface (HMI) 40. The computer 30 may also be operatively coupled to one or more external resources 42 via the network 6 (which may be network 21 for example) and/or I/O interface 38. External resources may include, but are not limited to, servers, databases, mass storage devices, peripheral devices, cloud-based network services, or any other suitable computing resource that may be used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, non-volatile solid state device, or any other device capable of storing information. A database 44 may reside on the mass storage memory device 36, and may be used to collect and organize data used by the various systems and modules described herein.

Processor 32 may operate under the control of an operating system 46 that resides in memory 34. The operating system 46 may manage computing resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, and/or application 48 to store or manipulate data.

The I/O interface 38 may provide a machine interface that operatively couples the processor 32 to other devices and systems, such as the network 6 and/or external resource 42. The application 48 may thereby work cooperatively with the network 6 and/or external resource 42 by communicating via the I/O interface 38 to provide the various features, functions, applications, processes, and/or modules comprising embodiments of the invention. The application 48 may also have program code that is executed by one or more external resources 42, or otherwise rely on functions and/or signals provided by other system or network components external to the computer 30. Indeed, embodiments of the invention may include applications that are located externally to the computer 30, distributed among multiple computers or other external resources 42, or provided by computing resources (hardware and software) that are provided as a service over the network 6, such as a cloud computing service.

The HMI 40 may be operatively coupled to the processor 32 of computer 30 in a known manner to allow a user of the computer 30 to interact directly with the computer 30. The HMI 40 may include video and/or alphanumeric displays, a touch screen, a speaker, and any other suitable audio and visual indicators capable of providing information to the user. The HMI 40 may also include input devices and controls such as an alphanumeric keyboard, a pointing device, keypads, pushbuttons, control knobs, microphones, etc., capable of accepting commands or input from the user and transmitting the entered input to the processor 32.

The database 44 may reside on the mass storage memory device 36, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, an object-oriented database, or combinations thereof. A database management system in the form of a computer software application executing as instructions on the processor 32 may be used to access the information or data stored in records of the database 44 in response to a query, where a query may be dynamically determined and executed by the operating system 46, other applications 48, or one or more modules. Although embodiments of the invention may be described herein using relational, hierarchical, network, object-oriented, or other database terminology in specific instances, embodiments of the invention may use any suitable database management model, and are not limited to any particular type of database.

While the invention has particular advantages for content provider systems that support requests comprising at least some request parameters related to a date, a time and/or a location, such as a travel provider system, the embodiments of the invention may be applied to various types of content provider systems.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A server system configured to determine a list of products in response to a client request received from a client device during a request/response session at a given processing time, the client request comprising one or more request parameters, the server system comprising:
    one or more processors; and
    a memory coupled with the one or more processors, the memory including instructions that, when executed by the one or more processors, cause the system, in response to the client request, to:
        determine a list of main products, the list of main products comprising an estimation of one or more of the main products matching the client request, wherein a product provider system further cooperates with an auxiliary product estimation database configured to store historical data related to sets of auxiliary products, wherein each auxiliary product set identifies one or more auxiliary products related to a main product, wherein the historical data comprises data collected from previous request/response sessions, and each previous request/response session is implemented between a client device and a product provider system connected to the auxiliary product estimation database during a predefined time period before the processing time, and wherein the historical data is represented by a tree data structure comprising nodes;
        determine, based on the tree data structure, an occurrence frequency and an auxiliary product value information for each auxiliary product set from a list of auxiliary product sets, the list of auxiliary product sets comprising at least one auxiliary product set;
        determine, based on the associated auxiliary product value information for each auxiliary product set, a service value for each auxiliary product set of the list of auxiliary product sets;
        provide, based on the occurrence frequency and the service value for each auxiliary product set, a list of candidate auxiliary products for each main product for each auxiliary product set of the list of auxiliary product sets;
        determine an estimated auxiliary product value information for each auxiliary product set of the list of auxiliary product sets from real-time data; and
        update the auxiliary product value information based on the estimated auxiliary product value information for each auxiliary product set of the list of auxiliary product sets.

2. The server system of claim 1 wherein the tree data structure comprises a root node and a plurality of levels, each level of the tree data structure corresponds to a parameter derived from one or more request parameter, each node of a given level of the tree data structure comprises a node value representing a value of the parameter corresponding to the level, the value being assigned to the request parameter in the one or more previous request/response sessions over a time period, the last level of each branch of the tree comprises leaf nodes, and each leaf node corresponds to a given auxiliary product set.

3. The server system of claim 2 wherein each leaf node of the tree data structure corresponding to a given auxiliary product set further comprises a counter value and a value information, the counter value indicates a number of occurrences of the auxiliary product set in the previous request/response sessions, and the instructions, when executed by the one or more processors, further cause the system to:
    determine an occurrence frequency of each auxiliary product set of the list of auxiliary product sets using the counter value of the leaf node corresponding to the auxiliary product set in the tree data structure; and
    determine the auxiliary product value information for each auxiliary product set of the list of auxiliary product sets from the value information of the leaf node corresponding to the auxiliary product set in the tree data structure.

4. The server system of claim 3 wherein the value information comprised in each leaf node corresponding to a given auxiliary product set comprises a value range defined by a lower threshold and an upper threshold, the lower threshold represents the lower value assigned to the auxiliary product set in a previous request/response session during a predefined time period, and the upper threshold represents the higher value assigned to the auxiliary product set in a previous request/response session during the predefined time period.

5. The server system of claim 4 wherein the instructions, when executed by the one or more processors, further cause the system to:

if the client request comprises a request parameter specifying a given auxiliary product set, the list of auxiliary product sets comprises the auxiliary product set:
browse the tree data structure according to a tree search algorithm to determine a matching node having a path in the tree matching the request parameters of the client request; and
search for a leaf node in a subtree of the matching node that matches the given auxiliary product set and a threshold condition related to a leaf node occurrence frequency,
wherein the leaf node occurrence frequency and the auxiliary product value information of the auxiliary product set are retrieved from the leaf node.

6. The server system of claim 4 wherein the instructions, when executed by the one or more processors, further cause the system to:
if the client request does not comprise a request parameter specifying a given auxiliary product set:
browse the tree data structure according to a tree search algorithm to determine a matching node having a path in the tree matching the request parameters of the client request;
search for all leaf nodes in a subtree of the matching node;
determine a popularity indicator for the auxiliary product set associated with each found leaf node; and
select one or more auxiliary product sets among the auxiliary product sets associated with the found leaf nodes depending on the popularity indicators,
wherein the selected auxiliary product sets are added in the list of auxiliary product sets, and the occurrence frequency and the value information of each auxiliary product set in the list of auxiliary product sets are retrieved from the corresponding leaf node.

7. The server system of claim 6 wherein the popularity indicator for the auxiliary product set associated with each found leaf node is determined using the occurrence frequency associated with the leaf node.

8. The server system of claim 1 wherein the instructions, when executed by the one or more processors, further cause the system to:
integrate the auxiliary product value information of each auxiliary product set of the list of auxiliary product sets to a value of a main product determined by an auxiliary product estimator, depending on an applicability flag.

9. The server system of claim 1 wherein the instructions, when executed by the one or more processors, further cause the system to:
collect learning metadata during a predefined learning period; and
manage the tree data structure using the collected learning metadata.

10. The server system of claim 9 wherein the instructions, when executed by the one or more processors, further cause the system to:
generate a node in the tree data structure in response to a specification of a new value of a parameter corresponding to a level of the tree, in a real-time request/response session; and
set a counter value of the node to the value 1.

11. The server system of claim 9 wherein the instructions, when executed by the one or more processors, further cause the system to:
update a node in the tree data structure each time the value associated with the node is specified in a request/response session for the parameter corresponding to a node level; and
increment a counter value of the node.

12. The server system of claim 9 wherein the instructions, when executed by the one or more processors, further cause the system to:
periodically check the configuration of the tree data structure; and
apply a balancing algorithm to the tree data structure if the tree data structure is unbalanced.

13. A method of determining a list of products in response to a client request received from a client device during a request/response session at a given processing time, the client request comprising one or more request parameters, the method comprising:
at a device with one or more processors and a computer-readable storage medium:
determining a list of main products, the list of main products comprising an estimation of one or more of the main products matching the client request, wherein a product provider system further cooperates with an auxiliary product estimation database configured to store historical data related to sets of auxiliary products, wherein each auxiliary product set identifies one or more auxiliary products related to a main product, wherein the historical data comprises data collected from previous request/response sessions, and each previous request/response session is implemented between a client device and a product provider system connected to the auxiliary product estimation database during a predefined time period before the processing time;
determining an occurrence frequency and an auxiliary product value information for each auxiliary product set in a list of auxiliary product sets, from a tree data structure representing the historical data related to the sets of auxiliary products, in response to the client request, the list of auxiliary product sets comprising at least one auxiliary product set, the tree data structure comprising nodes;
determining, based on the associated auxiliary product value information for each auxiliary product set, a service value for each auxiliary product set of the list of auxiliary product sets;
providing, based on the occurrence frequency and the service value for each auxiliary product set, a list of candidate auxiliary products for each main product for each auxiliary product set of the list of auxiliary product sets;
determining an estimated auxiliary product value information for each auxiliary product set of the list of auxiliary product sets from real-time data; and
updating the auxiliary product value information based on the estimated auxiliary product value information for each auxiliary product set of the list of auxiliary product sets.

14. The method of claim 13 wherein the tree data structure comprises a root node and a plurality of levels, each level of the tree data structure corresponds to a parameter derived from one or more request parameter, each node of a given level of the tree data structure comprises a node value representing a value of the parameter corresponding to the level, the value being assigned to the request parameter in the one or more previous request/response sessions over a time period, the last level of each branch of the tree comprises leaf nodes, and each leaf node corresponds to a given auxiliary product set.

15. The method of claim 14, wherein each leaf node of the tree data structure corresponding to a given auxiliary product set further comprises a counter value and a value information, wherein the counter value indicates a number of occurrences of the auxiliary product set in the previous request/response sessions, wherein the method further comprises:
   determining an occurrence frequency of each auxiliary product set of the list of auxiliary product sets using the counter value of the leaf node corresponding to the auxiliary product set in the tree data structure; and
   determining the auxiliary product value information for each auxiliary product set of the list of auxiliary product sets from the value information of the leaf node corresponding to the auxiliary product set in the tree data structure.

16. The method of claim 15 wherein the value information comprised in each leaf node corresponding to a given auxiliary product set comprises a value range defined by a lower threshold and an upper threshold, the lower threshold represents the lower value assigned to the auxiliary product set in a previous request/response session during a predefined time period, and the upper threshold represents the higher value assigned to the auxiliary product set in a previous request/response session during the predefined time period.

17. The method of claim 16, wherein, if the client request comprises a request parameter specifying a given auxiliary product set, and the list of auxiliary product sets comprises the auxiliary product set, the method further comprises:
   browsing the tree data structure according to a tree search algorithm to determine a matching node having a path in the tree matching the request parameters of the client request; and
   searching for a leaf node in a subtree of the matching node that matches the given auxiliary product set and a threshold condition related to a leaf node occurrence frequency,
   wherein the leaf node occurrence frequency and the auxiliary product value information of the auxiliary product set are retrieved from the leaf node.

18. The method of claim 16, wherein, if the client request does not comprise a request parameter specifying a given auxiliary product set, the method further comprises:
   browsing the tree data structure according to a tree search algorithm to determine a matching node having a path in the tree matching the request parameters of the client request;
   searching for all leaf nodes in a subtree of the matching node;
   determining a popularity indicator for the auxiliary product set associated with each found leaf node; and
   selecting one or more auxiliary product sets among the auxiliary product sets associated with the found leaf nodes depending on the popularity indicators,
   wherein the selected auxiliary product sets are added in the list of auxiliary product sets, and the occurrence frequency and the value information of each auxiliary product set in the list of auxiliary product sets are retrieved from the corresponding leaf node.

19. The method of claim 18 wherein the popularity indicator for the auxiliary product set associated with each found leaf node is determined using the occurrence frequency associated with the leaf node.

20. The method of claim 13, further comprising:
   integrating the information value of each auxiliary product set of the list of auxiliary product sets to the value of a main product determined by the product estimator, depending on an applicability flag.

21. The method of claim 13, further comprising:
collecting learning metadata during a predefined learning period; and
managing the tree data structure using the collected learning metadata.

22. The method of claim 21, further comprising:
generating a node in the tree data structure in response to a specification of a new value of a parameter corresponding to a level of the tree, in a real-time request/response session; and
setting a counter value of the node to the value 1.

23. The method of claim 22, further comprising:
updating a node in the tree data structure each time the value associated with the node is specified in a request/response session for the parameter corresponding to a node level; and
incrementing the counter value of the node.

24. The method of claim 21, further comprising:
periodically checking a configuration of the tree data structure; and
applying a balancing algorithm to the tree data structure if the tree data structure is unbalanced.

25. A computer program product for determining a list of products in response to a client request received from a client device during a request/response session at a given processing time, the client request comprising one or more request parameters, the computer program product comprising:
   a non-transitory computer-readable storage medium; and
   program code stored on the non-transitory computer-readable storage medium that, when executed by one or more processors, causes the one or more processors to:
      determine a list of main products, the list of main products comprising an estimation of one or more of the main products matching the client request, wherein a product provider system further cooperates with an auxiliary product estimation database configured to store historical data related to sets of auxiliary products, wherein each auxiliary product set identifies one or more auxiliary products related to a main product, wherein the historical data comprises data collected from previous request/response sessions, and each previous request/response session is implemented between a client device and a product provider system connected to the auxiliary product estimation database during a predefined time period before the processing time, and wherein the historical data is represented by a tree data structure comprising nodes;
      determine an occurrence frequency and an auxiliary product value information for each auxiliary product set in a list of auxiliary product sets, from a tree data structure representing the historical data related to the sets of auxiliary products, in response to the client request, the list of auxiliary product sets comprising at least one auxiliary product set, the tree data structure comprising nodes;
      determine, based on the associated auxiliary product value information for each auxiliary product set, a service value for each auxiliary product set of the list of auxiliary product sets;
      provide, based on the occurrence frequency and the service value for each auxiliary product set, a list of candidate auxiliary products for each main product for each auxiliary product set of the list of auxiliary product sets;

determine an estimated auxiliary product value information for each auxiliary product set of the list of auxiliary product sets from real-time data; and update the auxiliary product value information based on the estimated auxiliary product value information for each auxiliary product set of the list of auxiliary product sets.

\* \* \* \* \*